US007884849B2

(12) United States Patent
Yin et al.

(10) Patent No.: US 7,884,849 B2
(45) Date of Patent: Feb. 8, 2011

(54) VIDEO SURVEILLANCE SYSTEM WITH OMNI-DIRECTIONAL CAMERA

(75) Inventors: Weihong Yin, Herndon, VA (US); Li Yu, Herndon, VA (US); Zhong Zhang, Herndon, VA (US); Andrew J. Chosak, Arlington, VA (US); Niels Haering, Reston, VA (US); Alan J. Lipton, Herndon, VA (US); Paul C. Brewer, Arlington, VA (US); Peter L. Venetianer, McLean, VA (US)

(73) Assignee: ObjectVideo, Inc., Reston, VA (US)

( * ) Notice: Subject to any disclaimer, the term of this patent is extended or adjusted under 35 U.S.C. 154(b) by 1535 days.

(21) Appl. No.: 11/234,377

(22) Filed: Sep. 26, 2005

(65) Prior Publication Data

US 2007/0070190 A1 Mar. 29, 2007

(51) Int. Cl.
*H04N 5/30* (2006.01)
*H04N 7/00* (2006.01)

(52) U.S. Cl. ...................................... 348/143; 348/119

(58) Field of Classification Search ................. 340/517, 340/525; 250/206.02, 208.1, 214 DC; 348/211.12, 348/14.08, 211.99, 211.1, 211.4, 14.07, 14.11, 348/14.12, 36, 143, 211.2, 211.3; 381/92
See application file for complete search history.

(56) References Cited

U.S. PATENT DOCUMENTS

| | | | | |
|---|---|---|---|---|
| 4,939,369 | A * | 7/1990 | Elabd | 250/332 |
| 6,707,489 | B1 * | 3/2004 | Maeng et al. | 348/211.12 |
| 7,130,383 | B2 * | 10/2006 | Naidoo et al. | 379/37 |
| 2007/0058879 | A1 * | 3/2007 | Cutler et al. | 382/254 |

* cited by examiner

*Primary Examiner*—Jerome Grant, II
(74) *Attorney, Agent, or Firm*—Venable LLP; Michael A. Sartori; Jeffri A. Kaminski

(57) ABSTRACT

A method of operating a video surveillance system is provided. The video surveillance system including at least two sensing units. A first sensing unit having a substantially 360 degree field of view is used to detect an event of interest. Location information regarding a target is sent from the first sensing unit to at least one second sensing unit when an event of interest is detected by the first sensing unit.

36 Claims, 26 Drawing Sheets

Tripwire is drawn in panoramic view 1802

1800

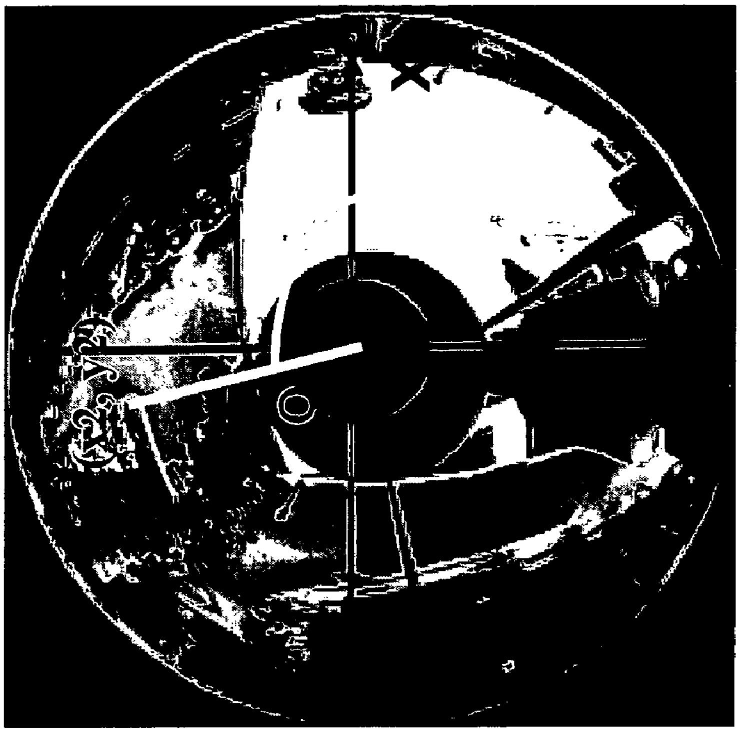
Fig. 21B
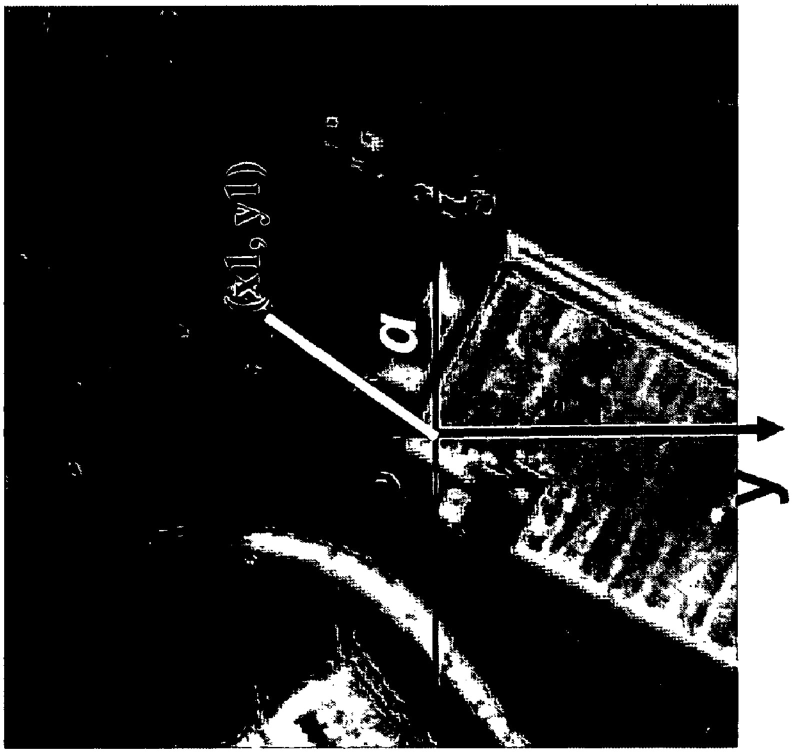
FIG 21A
Figure 21

VIDEO SURVEILLANCE SYSTEM WITH OMNI-DIRECTIONAL CAMERA

BACKGROUND OF THE INVENTION

1. Field of the Invention

This invention relates to surveillance systems. Specifically, the invention relates to a video-based surveillance system that uses an omni-directional camera as a primary sensor. Additional sensors, such as pan-tilt-zoom cameras (PTZ cameras), may be applied in the system for increased performance.

2. Related Art

Some state-of-the-art intelligent video surveillance (IVS) systems can perform content analysis on frames generated by surveillance cameras. Based on user-defined rules or policies, IVS systems can automatically detect potential threats by detecting, tracking and analyzing the targets in the scene. One significant constraint of the system is the limited field-of-view (FOV) of a traditional perspective camera. A number of cameras can be employed in the system to obtain a wider FOV. However increasing the number of cameras increases the complexity and cost of system. Additionally, increasing the number of cameras also increases the complexity of the video processing since targets need to be tracked from camera to camera.

An IVS system with a wide field of view has many potential applications. For example, there is a need to protect a vessel when in-port. The vessel's sea-scanning radar provides a clear picture of all other vessels and objects in the vessel's vicinity when the vessel in underway. This continuously updated picture is the primary source of situation awareness for the watch officer. In port, however, the radar is less useful due to the large amount of clutter in a busy port facility. Furthermore, it may be undesirable or not permissible to use active radar in certain ports. This is problematic because naval vessels are most vulnerable to attack, such as a terrorist attack, when the vessel is in port.

Thus, there is a need for a system with substantially 360° coverage, automatic target detection, tracking and classification and real-time alert generation. Such a system would significantly improve the security of the vessel and may be used in many other applications.

SUMMARY OF THE INVENTION

Embodiments of the invention include a method, a system, an apparatus, and an article of manufacture for video surveillance. An omni-directional camera is ideal for a video surveillance system with a wider field of view because of its seamless coverage and passive, high-resolution feature.

Embodiments of the invention may include a machine-accessible medium containing software code that, when read by a computer, causes the computer to perform a method for video surveillance. A method of operating a video surveillance system, the video surveillance system including at least two sensing units, the method comprising using a first sensing unit having a substantially 360 degree field of view to detect an event of interest, sending location information regarding a target from the first sensing unit to at least one second sensing unit when an event of interest is detected by the first sensing unit.

A system used in embodiments of the invention may include a computer system including a computer-readable medium having software to operate a computer in accordance with embodiments of the invention.

An apparatus according to embodiments of the invention may include a computer including a computer-readable medium having software to operate the computer in accordance with embodiments of the invention.

An article of manufacture according to embodiments of the invention may include a computer-readable medium having software to operate a computer in accordance with embodiments of the invention.

Exemplary features of various embodiments of the invention, as well as the structure and operation of various embodiments of the invention, are described in detail below with reference to the accompanying drawings.

BRIEF DESCRIPTION OF THE DRAWINGS

The foregoing and other features of various embodiments of the invention will be apparent from the following, more particular description of such embodiments of the invention, as illustrated in the accompanying drawings, wherein like reference numbers generally indicate identical, functionally similar, and/or structurally similar elements.

FIG. 21 depicts an example of view offset.

DEFINITIONS

Figure 1:
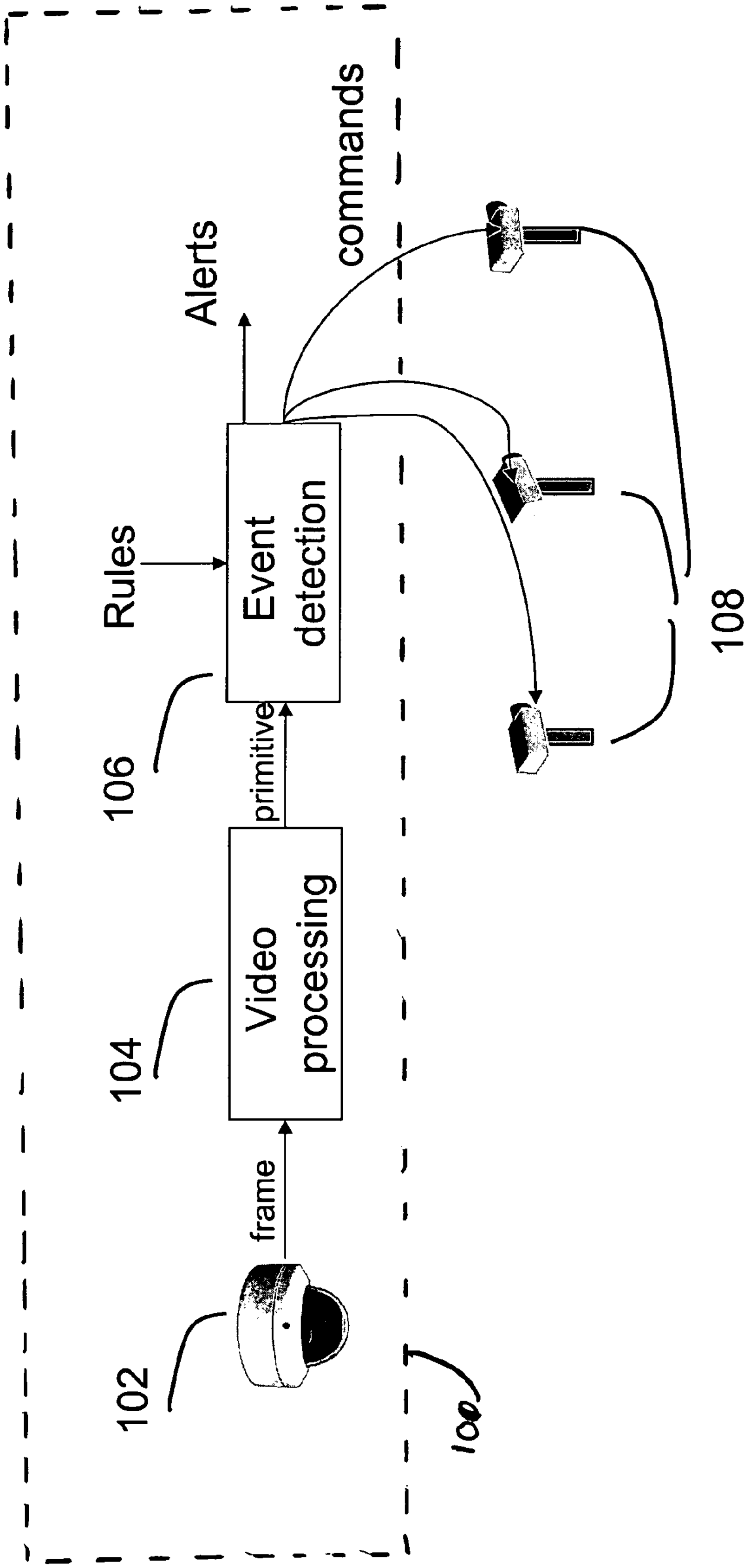
FIG. 1 depicts an exemplary embodiment of an intelligent video surveillance system with omni-directional camera as the prime sensor.

An "omni image" refers to the image generated by omni-directional camera, which usually has a circle view in it.

A "camera calibration model" refers to a mathematic representation of the conversion between a point in the world coordinate system and a pixel in the omni-directional imagery.

A "target" refers to a computer's model of an object. The target is derived from the image processing, and there is a one-to-one correspondence between targets and objects.

A "blob" refers generally to a set of pixels that are grouped together before further processing, and which may correspond to any type of object in an image (usually, in the context of video). A blob may be just noise, or it may be the representation of a target in a frame.

A "bounding-box" refers to the smallest rectangle completely enclosing the blob.

A "centroid" refers to the center of mass of a blob.

A "footprint" refers to a single point in the image which represents where a target "stands" in the omni-directional imagery.

A "video primitive" refers to an analysis result based on at least one video feed, such as information about a moving target.

A "rule" refers to the representation of the security events the surveillance system looks for. A "rule" may consist of a user defined event, a schedule, and one or more responses.

An "event" refers to one or more objects engaged in an activity. The event may be referenced with respect to a location and/or a time.

An "alert" refers to the response generated by the surveillance system based on user defined rules.

An "activity" refers to one or more actions and/or one or more composites of actions of one or more objects. Examples of an activity include: entering; exiting; stopping; moving; raising; lowering; growing; and shrinking.

The "calibration points" usually refers to a pair of points, where one point is in the omni-directional imagery and one point is in the map plane. The two points correspond to the same point in the world coordinate system.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

DETAILED DESCRIPTION OF EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

FIG. 1 depicts an exemplary embodiment of the invention. The system of FIG. 1 uses one camera 102, called the primary, to provide an overall picture of a scene, and another camera 108, called the secondary, to provide high-resolution pictures of targets of interest. There may be multiple primaries 102, the primary 102 may utilize multiple units (e.g., multiple cameras), and/or there may be one or multiple secondaries 108.

A primary sensing unit 100 may comprise, for example, a digital video camera attached to a computer. The computer runs software that may perform a number of tasks, including segmenting moving objects from the background, combining foreground pixels into blobs, deciding when blobs split and merge to become targets, tracking targets, and responding to a watchstander (for example, by means of e-mail, alerts, or the like) if the targets engage in predetermined activities (e.g., entry into unauthorized areas). Examples of detectable actions include crossing a tripwire, appearing, disappearing, loitering, and removing or depositing an item.

Upon detecting a predetermined activity, the primary sensing unit 100 can also order a secondary 108 to follow the target using a pan, tilt, and zoom (PTZ) camera. The secondary 108 receives a stream of position data about targets from the primary sensing unit 100, filters it, and translates the stream into pan, tilt, and zoom signals for a robotic PTZ camera unit. The resulting system is one in which one camera detects threats, and the other robotic camera obtains high-resolution pictures of the threatening targets. Further details about the operation of the system will be discussed below.

The system can also be extended. For instance, one may add multiple secondaries 108 to a given primary 102. One may have multiple primaries 102 commanding a single secondary 108. Also, one may use different kinds of cameras for the primary 102 or for the secondary(s) 108. For example, a normal, perspective camera or an omni-directional camera may be used as cameras for the primary 102. One could also use thermal, near-IR, color, black-and-white, fisheye, telephoto, zoom and other camera/lens combinations as the primary 102 or secondary 108 camera.

In various embodiments, the secondary 108 may be completely passive, or it may perform some processing. In a completely passive embodiment, secondary 108 can only receive position data and operate on that data. It can not generate any estimates about the target on its own. This means that once the target leaves the primary's field of view, the secondary stops following the target, even if the target is still in the secondary's field of view.

In other embodiments, secondary 108 may perform some processing/tracking functions. Additionally, when the secondary 108 is not being controlled by the primary 102, the secondary 108 may operate as an independent unit. Further details of these embodiments will be discussed below.

FIG. 1 depicts the overall video surveillance system according to an exemplary embodiment of the invention. In this embodiment, the primary sensing unit 100 includes an omni-directional camera 102 as the primary, a video processing module 104, and an event detection module 106. The omni-directional camera may have a substantially 360-degree field of view. A substantially 360-degree field of view includes a field of view from about 340 degrees to 360 degrees. The primary sensing unit 100 may include all the necessary video processing algorithms for activity recognition and threat detection. Additionally, optional algorithms provide an ability to geolocate a target in a 3D space using a single camera, and a special response that allows the primary 102 to send the resulting position data to one or more secondary sensing units, depicted here as PTZ cameras 108, via a communication system.

The omni-directional camera 102 obtains an image, such as frames of video data of a location. The video frames are provided to a video processing unit 104. The video processing unit 104 may perform object detection, tracking and classification. The video processing unit 104 outputs target primitives. Further details of an exemplary process for video processing and primitive generation may be found in commonly assigned U.S. patent application Ser. No. 09/987,707 filed Nov. 15, 2001, and U.S. patent application Ser. No. 10/740,511 filed Dec. 22, 2003, the contents of both of which are incorporated herein by reference.

The event detection module 106 receives the target primitives as well as user-defined rules. The rules may be input by a user using an input device, such as a keyboard, computer mouse, etc. Rule creation is described in more detail below. Based on the target primitives and the rules, the event detection module detects whether an event meeting the rules has occurred, an event of interest. If an event of interest is detected, the event detection module 106 may send out an alert. The alert may include sending an email alert, sounding an audio alarm, providing a visual alarm, transmitting a message to a personal digital assistant, and providing position information to another sensing unit. The position information may include commands for the angles for pan and tilt or zooming level for zoom for the secondary sensing unit 108. The secondary sensing unit 108 is then moved based on the commands to follow and/or zoom in on the target.

Figure 2:
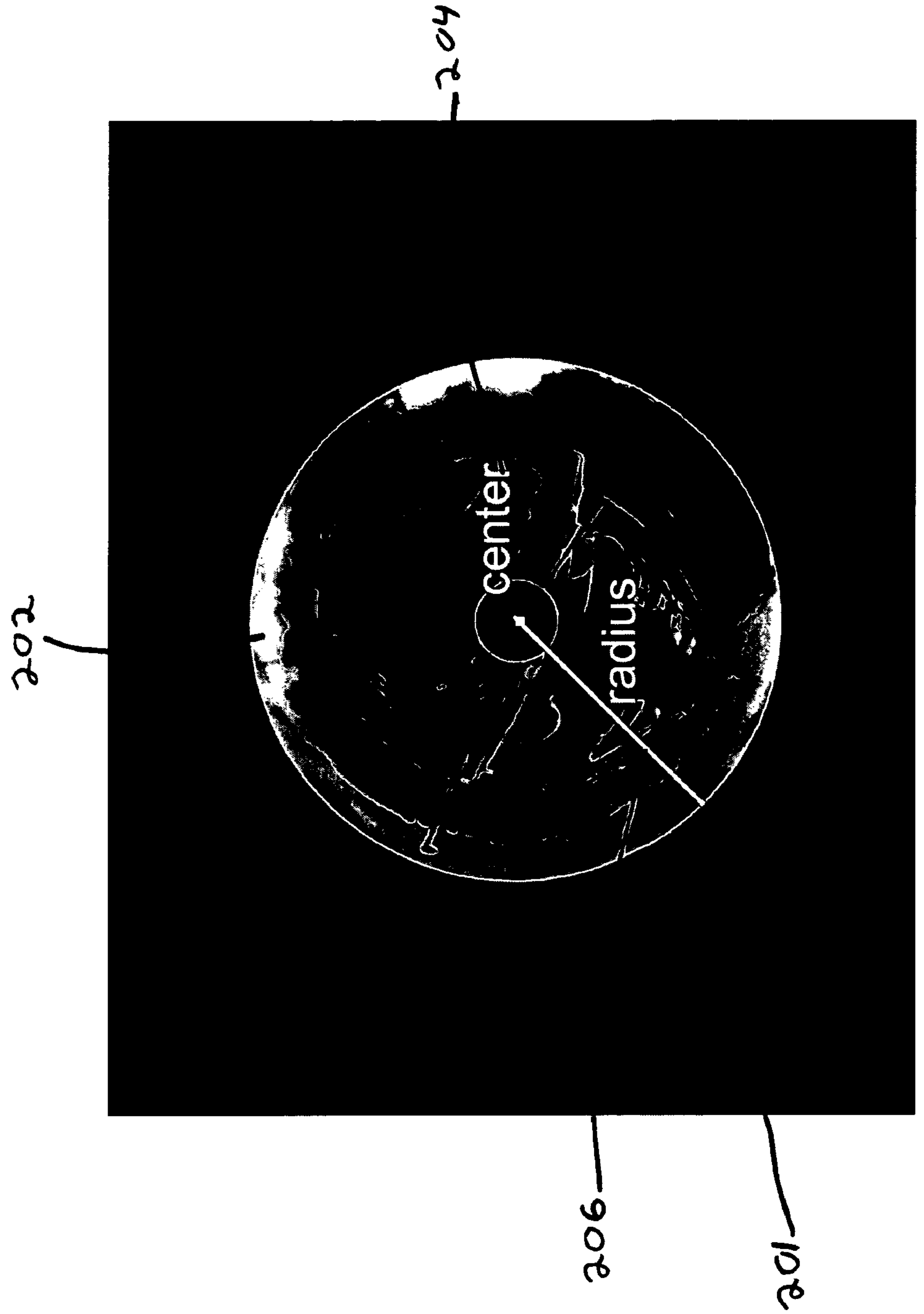
FIG. 2 depicts an example of omni-directional imagery.

As defined, the omni-directional camera may have a substantially 360-degree field of view. FIG. 2 depicts a typical image 201 created using an omni-directional camera. The image 201 is in the form of a circle 202, having a center 204 and a radius 206. As can be seen in FIG. 2, an image created by an omni-directional camera may not be easily understood by visual inspection. Moreover, with the use of advanced video processing algorithms, the present system may detect a very small target. A user may not be able to observe the details of the target by simply viewing the image from the omni-directional camera. Accordingly, the secondary sensing unit may follow targets and provide a user with a much clearer and detailed view of the target.

Omni-Directional Camera Calibrator

Camera calibration is widely used in computer vision applications. Camera calibration information may be used to obtain physical information regarding the targets. The physical information may include the target's physical size (height, width and depth) and physical location. The physical information may be used to further improve the performance of object tracking and classification processes used during video processing. In an embodiment of the invention, an omni-directional camera calibrator module may be provided to detect some of the intrinsic parameters of the omni-directional camera. The intrinsic parameters may be used for camera calibration. The camera calibrator module may be provided as part of video processing unit 104.

Referring again to FIG. 2, the radius 206 and the center 204 of the circle 202 in the omni image 201 may be used to calculate the intrinsic parameters of the omni-directional camera 102, and later be used for camera calibration. Generally, the radius 206 and center 204 are measured manually by user, and input into the IVS system. The manual approach requires the user to take the time for measurement and the results of the measurement may not be accurate. The present embodiment may provide for automatically determining the intrinsic parameters of the omni-directional camera.

Figure 3:
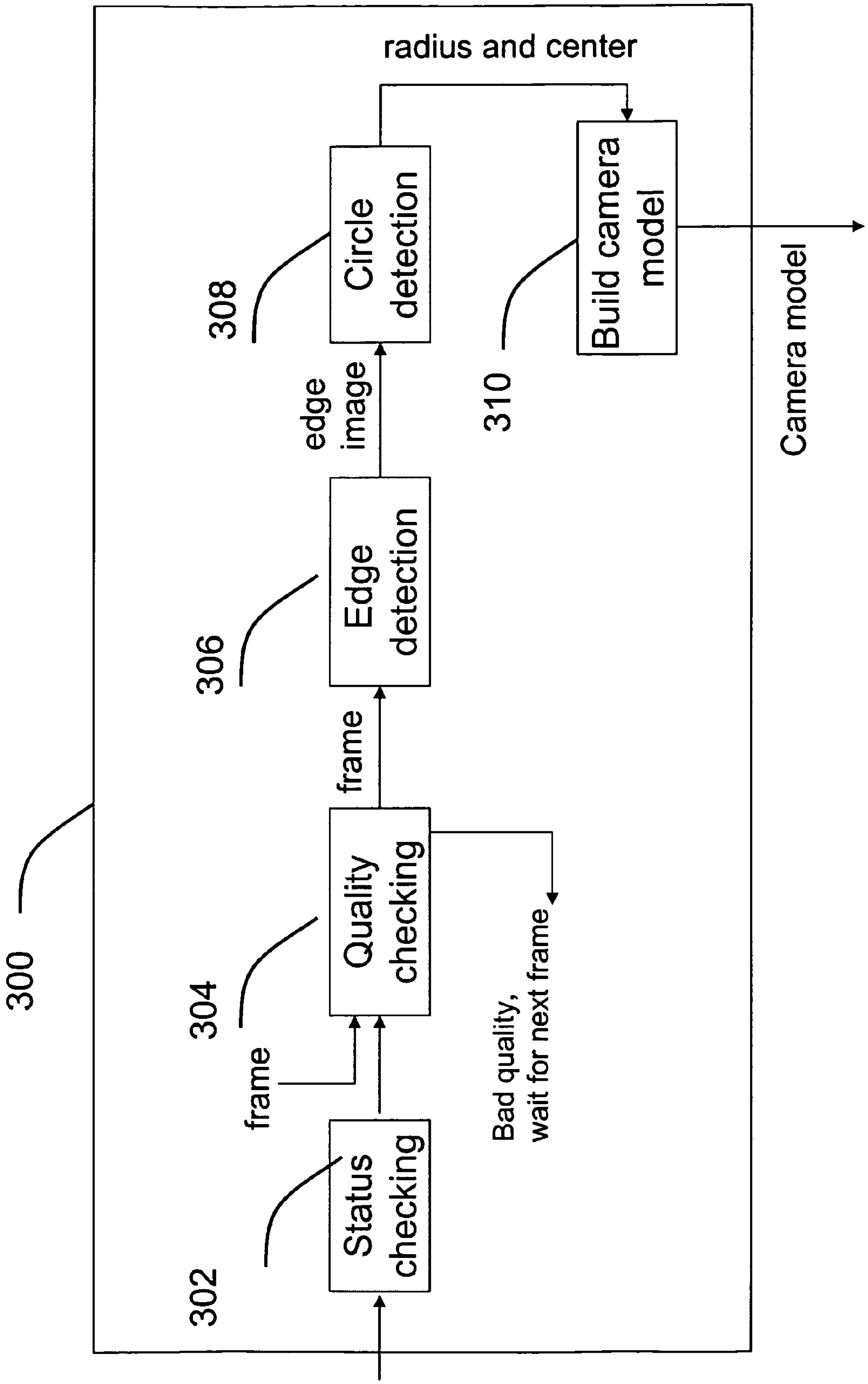
FIG. 3 depicts the structure of omni-directional camera calibrator according to an exemplary embodiment of the present invention.

FIG. 3 illustrates an exemplary automatic omni-directional calibrator module 300. The user may have the option of selecting the automatic calibration or manually, that is the user may still manually provide the radius and center of the circle from the image. If the user selects to perform automatic calibration, a flag is set indicating that auto-calibration is selected. A status checking module 302 determines if the user has manually provided the radius and center and if the auto-calibration flag is set. If the auto-calibration flag is set, the automatic calibration process continues. A video frame from the omni-directional camera is input into quality checking module 304. Quality checking module 304 determines if the input video frame is valid. An input video frame is valid if it has a video signal and is not too noisy. Validity of the frame may be determined by examining the input frame's signal-to-noise ratio. The thresholds for determining a valid frame may vary based on user preference and the specific implementation. For instance, if the scene typically is very stable or has low traffic, a higher threshold might be applied; if the scene is busy, or it is rain/snow scenario, a lower threshold might be applied.

If the input frame is not valid, the module 300 may wait for the next frame from the omni-directional camera. If the input frame is valid, edge detection model 306 reads in the frame and performs edge detection to generate a binary edge image. The binary edge image is then provided to circle detection module 308. Circle detection module 308 reads in the edge image and performs circle detection. The parameters used for edge detection and circle detection are determined by the dimensions of the input video frame. The algorithms for edge detection and circle detection are known to those skilled in the art. The results of the edge detection and circle detection include the radius and center of the circle in the image from the omni-directional camera. The radius and center are provided to a camera-building module 310, which builds the camera model in a known manner.

For example, the camera model may be built based on the radius and center of the circle in the omni image, the camera geometry and other parameters, such as the camera physical height. The camera model may be broadcast to other modules which may need the camera model for their processes. For example, an object classifier module may use the camera model to compute the physical size of the target and use the physical size in the classification process. An object tracker module may use the camera model to compute the target's physical location and then apply the physical location in the tracking process. An object detector module may use the camera model to improve its performance speed. For example, only the pixels inside the circle are meaningful for object detection and may be processed to detect a foreground region during video processing.

Target Classification in Omni-Directional Imagery

Figure 4:
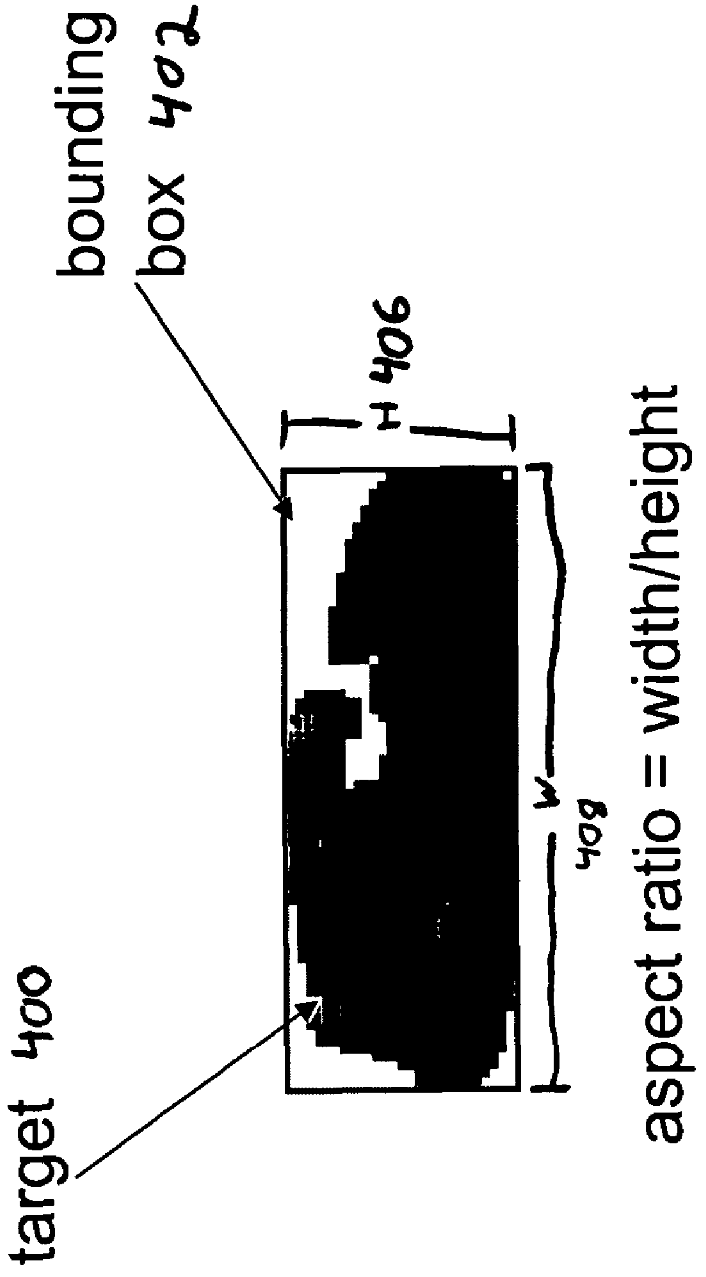
FIG. 4 depicts an example of a detected target with its bounding box according to an exemplary embodiment of the present invention.

Target classification is one of the major components of an intelligent video surveillance system. Through target classification, a target may be classified as human, vehicle or another type of target. The number of target types available depends on the specific implementation. One of the features of a target that is generally used in target classification is the aspect-ratio of the target, which is the ratio between width and height of the target bounding box. FIG. 4 depicts an example of the meaning of the target bounding box and aspect-ratio. A target 400 is located by the IVS. A bounding box 404 is created for the target 402. A length 406 and width 408 of the bounding box 404 are used in determining the aspect ratio.

The magnitude of the aspect ration of a target may be used to classify the target. For example, when the aspect-ratio for a target is larger than a specified threshold (for instance, the threshold may be specified by a user to be 1), the target may be classified as one type of target, such as vehicle; otherwise, the target may be classified as another type of target, such as human.

For an omni-directional camera, a target is usually warped in the omni image. Additionally, the target may lie along the radius of the omni image. In such cases, classification performed based on a simple aspect ratio may cause a classification error. According to an exemplary embodiment of the invention, a warped aspect-ratio may be used for classification:

$$R_w = \frac{W_w}{H_w}$$

Where $W_w$ and $H_w$ are the warped width and height and $R_w$ is the warped aspect ratio. The warped width and height may be computed based on information regarding the target shape, the omni-directional camera calibration model, and the location of the target in the omni image.

Figure 5:
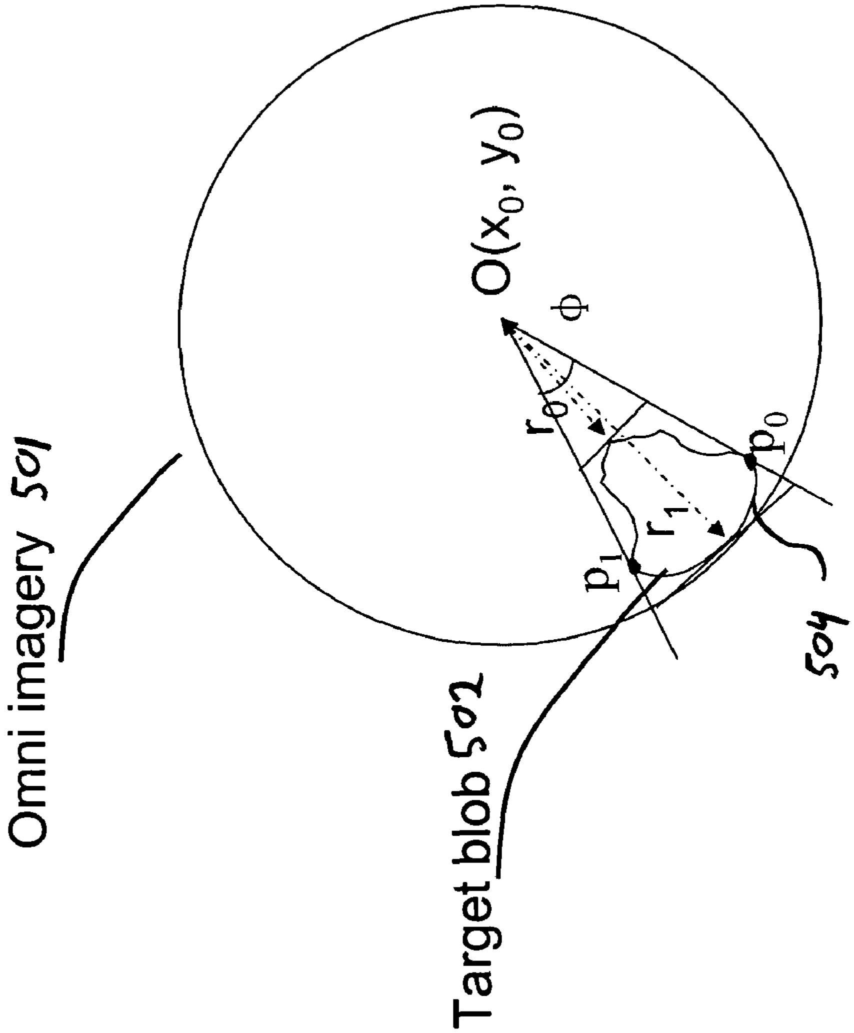
FIG. 5 depicts how the warped aspect ratio is computed according to an exemplary embodiment of the present invention.

Referring to FIG. 5, an exemplary method for determining the warped width and warped height is described. FIG. 5 illustrates an omni-image 501 having a center O. A target blob 502 is present in the image 501. The target blob 502 has a contour 504, which may be determined by video processing. A point on the contour 504 that is closest to center O and the distance $r_0$ between that point and the center O is determined. A point on the contour that is farthest from the center O and the distance $r_1$ between that point and the center O is determined. The two points, $P_0$ and $P_1$, that are widest from each other on the contour 504 of the target blob 502 are also determined. In FIG. 5, points $P_0$ and $P_1$ represent the two points on the contour 504 between which an angle $\phi$ is the largest. Angle $\phi$ represents the largest angle among all the angles between any two points on the target contour 504.

Figure 22:
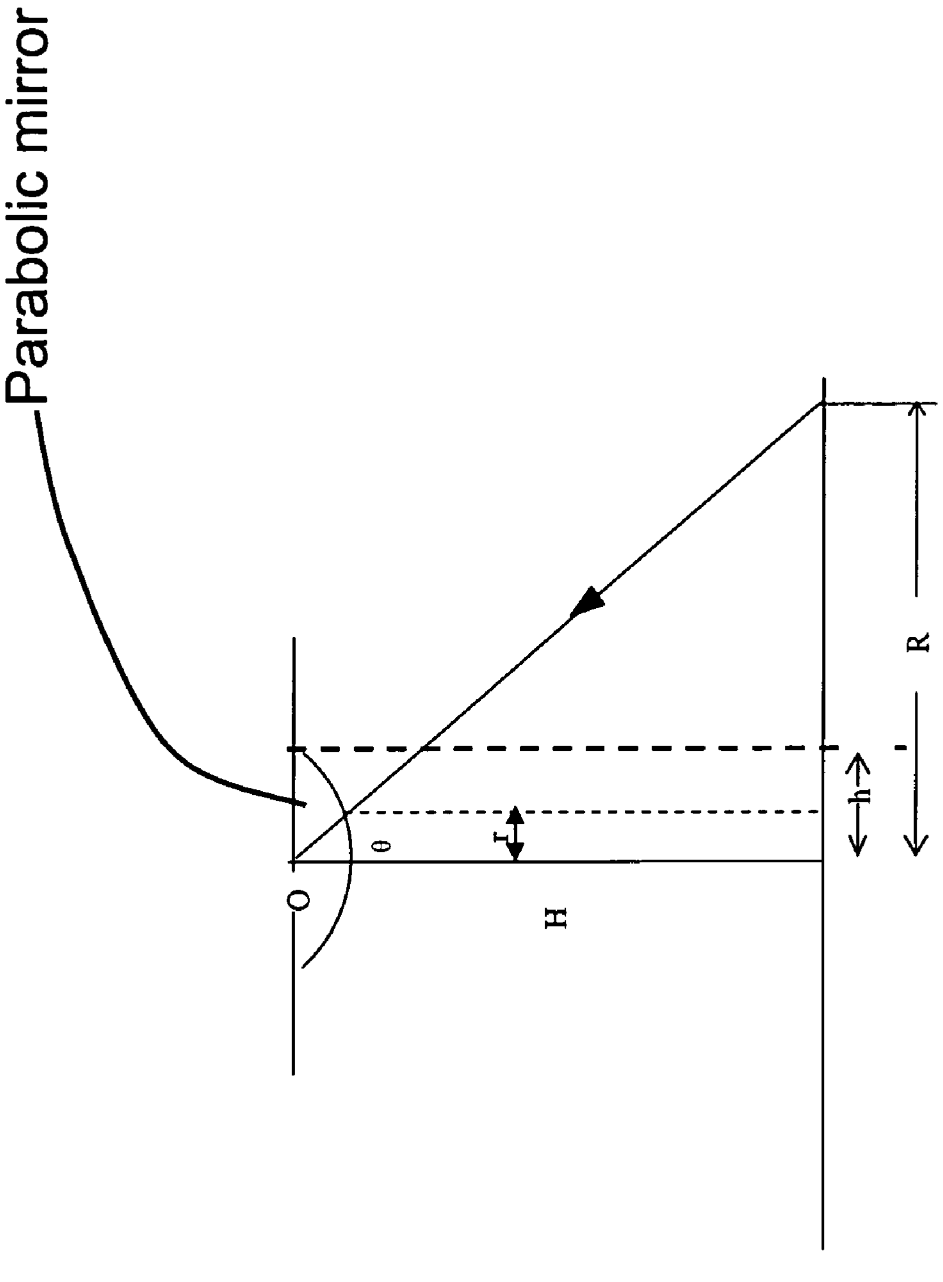
FIG. 22 depicts the geometry model of an omni-directional camera using a parabolic mirror.

After these values are determined, the camera model may be used to calculate the warped width and warped height. A classification scheme similar to that described above for the aspect ratio may then be applied. For instance, an omni-directional camera with a parabolic mirror may used as the primary. A geometry model for such a camera is illustrated in FIG. 22. The warped weight and warped height should be computed using the following equations, where Fw( ) and Fh( ) are the functions decided by the camera calibration model, h is the circle radius, $r_0$, $r_1$ and $\phi$ are presented in FIG. 5:

$$W_w = F_w(h, r_0, r_1, \phi)$$

$$H_w = F_H(h, r_0, r_1, \phi)$$

Figure 6:
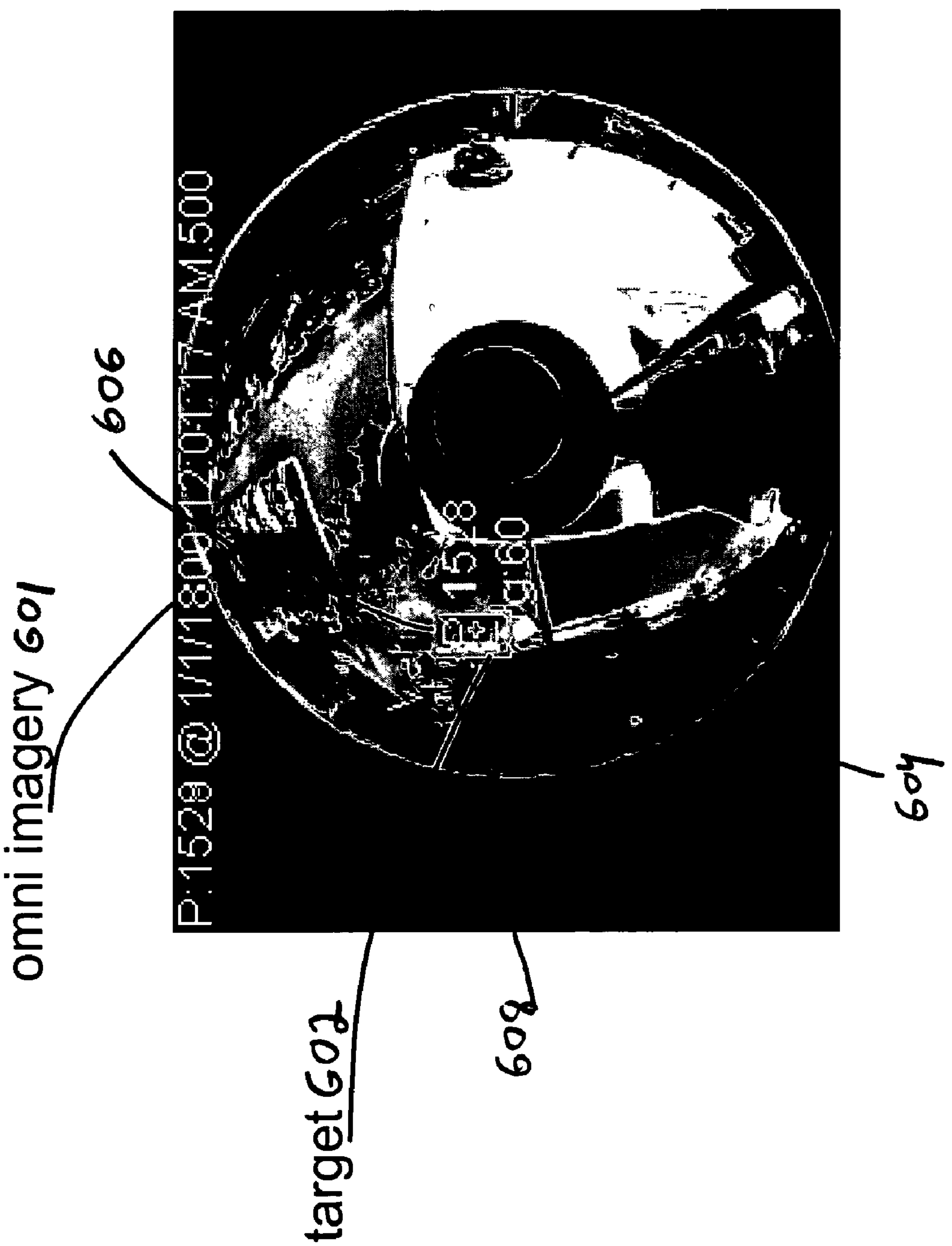
FIG. 6 depicts the target classification result in omni imagery by using the warped aspect ratio according to an exemplary embodiment of the present invention.

FIG. 6 depicts an example of target classification based on the warped aspect ratio. FIG. 6 illustrates an omni-image 601. A target 602 has been identified in the omni-image 601. A bounding box 604 has been created for the target 602. A width 606 of the target 602 is less than the height 608 for the target 602. As such, the aspect ratio for this target 602 is less than one. Using a classification scheme based on a simple aspect ratio results in target 602 being classified as a human, when target 602 is in fact a vehicle. By using the warped aspect ratio for classification, the target is correctly classified as a vehicle.

While aspect ratio and warped aspect ratio are very useful in target classification, sometimes, a target may be misclassified. For instance, as a car drives towards the omni-directional camera, the warped aspect ratio of the car may be smaller than the specified threshold. As a result, the car may be misclassified as human. However, the size of the vehicle target in the real world is much larger than a size of a human target in the real world. Furthermore some targets, which only contain noise, may be classified as human, vehicle or another meaningful type of target. The size of the target measured in the real world may be much bigger or smaller than the meaningful types of targets. Consequently, the physical characteristics of a target may be useful as an additional measure for target classification. In an exemplary embodiment of the invention, a target size map may be used for classification. A target size map may indicate the expected size of a particular target type at various locations in an image.

As an example of the use of a target size map, classification between human and vehicle targets is described. However, the principles discussed may be applied to other target types. A human size map is useful for target classifications. One advantage of using human size is that the depth of a human can be ignored and the size of a human is usually a relatively constant value. The target size map, in this example a human size map, should be equal in size to the image so that every pixel in the image has a corresponding pixel in the target size map. The value of each pixel in the human size map represents the size of a human in pixels at the corresponding pixel in the image. An exemplary process to build the human size map is depicted in FIG. 7.

Figure 7:
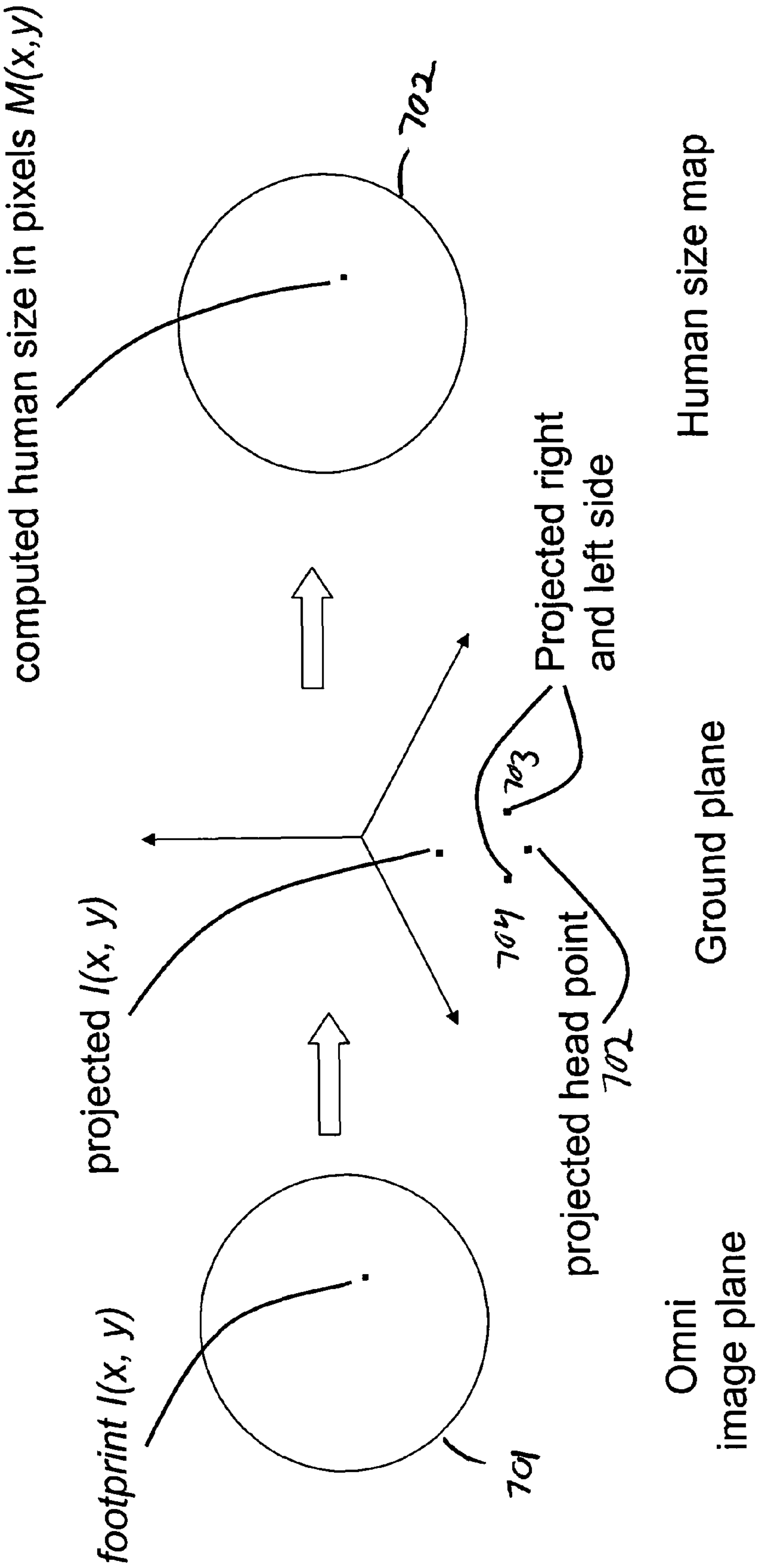
FIG. 7 depicts how the human size map is built according to an exemplary embodiment of the present invention.

FIG. 7 shows an omni-image 701. A particular pixel I(x, y) within the image 701 is selected for processing. In creating a human size map, it is assumed that the selected pixel I(x, y) is the footprint of a human target in the image 701. If another type of map is being created, it should be assumed that the pixel represents the footprint of that type of target. The selected pixel I(x, y) in the image 701 is then transformed to the ground plane based on the camera calibration model. The coordinates of the human's head, left and right sides on the ground plane are determined based on the projected pixel. It is assumed for this purpose that the height of the human is approximately 1.8 meters and the width of the human is approximately 0.5 meters. The resulting projection points for the head, left and right sides 702-704, respectively, on the ground plane can be seen in FIG. 7. The projection points for the head, left and right sides are then transformed back to the image 701 using the camera calibration model. The height of a human whose image footprint is located at that selected location, I(x, y), may be equal to the Euclidean distance between the projection point of the head and the footprint on the image 701. The width of a human at that particular pixel may be equal to the Euclidean distance between the projection points of the left and right sides 703, 704 of the human in the image plane. The size of the human in pixels M(x, y) may be represented by the multiplication of the computed height and width. The size of a human with a footprint at that particular pixel is then stored in the human map 702 at that location M(x, y). This process may be repeated for each pixel in the image 701. As a result, the human size map will include a size in pixels of a human at each pixel in the image.

Figure 8:
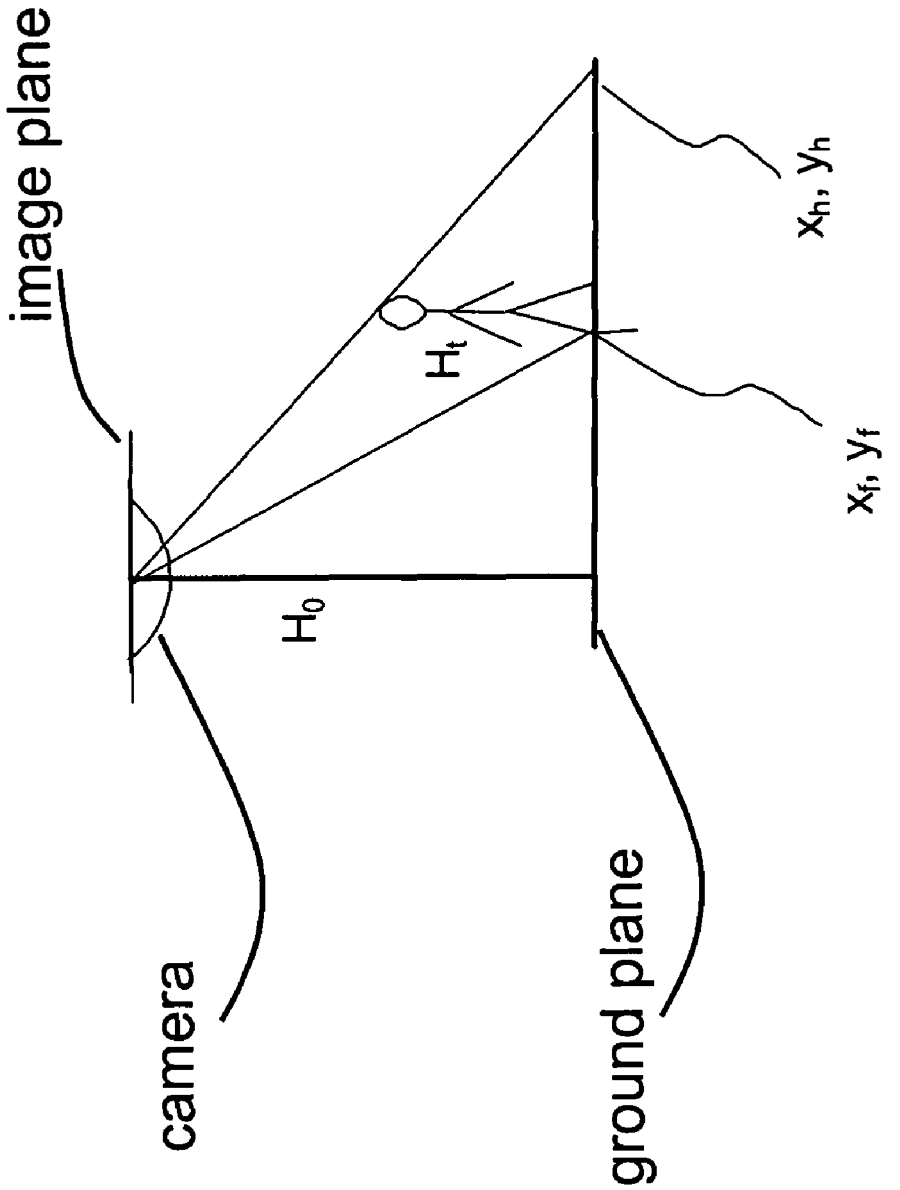
FIG. 8 depicts the projection of the human's head on the ground plane according to an exemplary embodiment of the present invention.

FIG. 8 depicts the image of a human's head projected on the ground plane. The center of the image plane is projected to the ground plane. $H_0$ indicates the height of the camera, and $H_t$ indicates the physical height of the human. The human height $h_t$ in the image plane at a particular pixel, may be calculated using the following equations:

$$h_t = \sqrt{(x'_h - x'_f)^2 + (y'_h - y'_f)^2}$$

$$x'_h = F_0(x_h, y_h) \quad y'_h = F_1(x_h, y_h)$$

$$x_h = \frac{H_0 x_f}{H_0 - H_t} \quad y_h = \frac{H_0 y_f}{H_0 - H_t}$$

$$x_f = F'_0(x'_f, y'_f) \quad y_f = F'_1(x'_f, y'_f)$$

Where $(x_f, y_f)$ and $(x_h, y_h)$ are the coordinates of the footprint and head in world coordinate system separately; $(x'_f, y'_f)$ and $(x'_h, y'_h)$ are the coordinates of footprint and head in the omni image separately. $F_0(\,)$ and $F_1(\,)$ denote the transform functions from world coordinates to image coordinates; $F'_0(\,)$ and $F'_1(\,)$ denote the transform functions from image coordinates to world coordinates. All of the functions should be decided by the camera calibration model.

Figure 9:
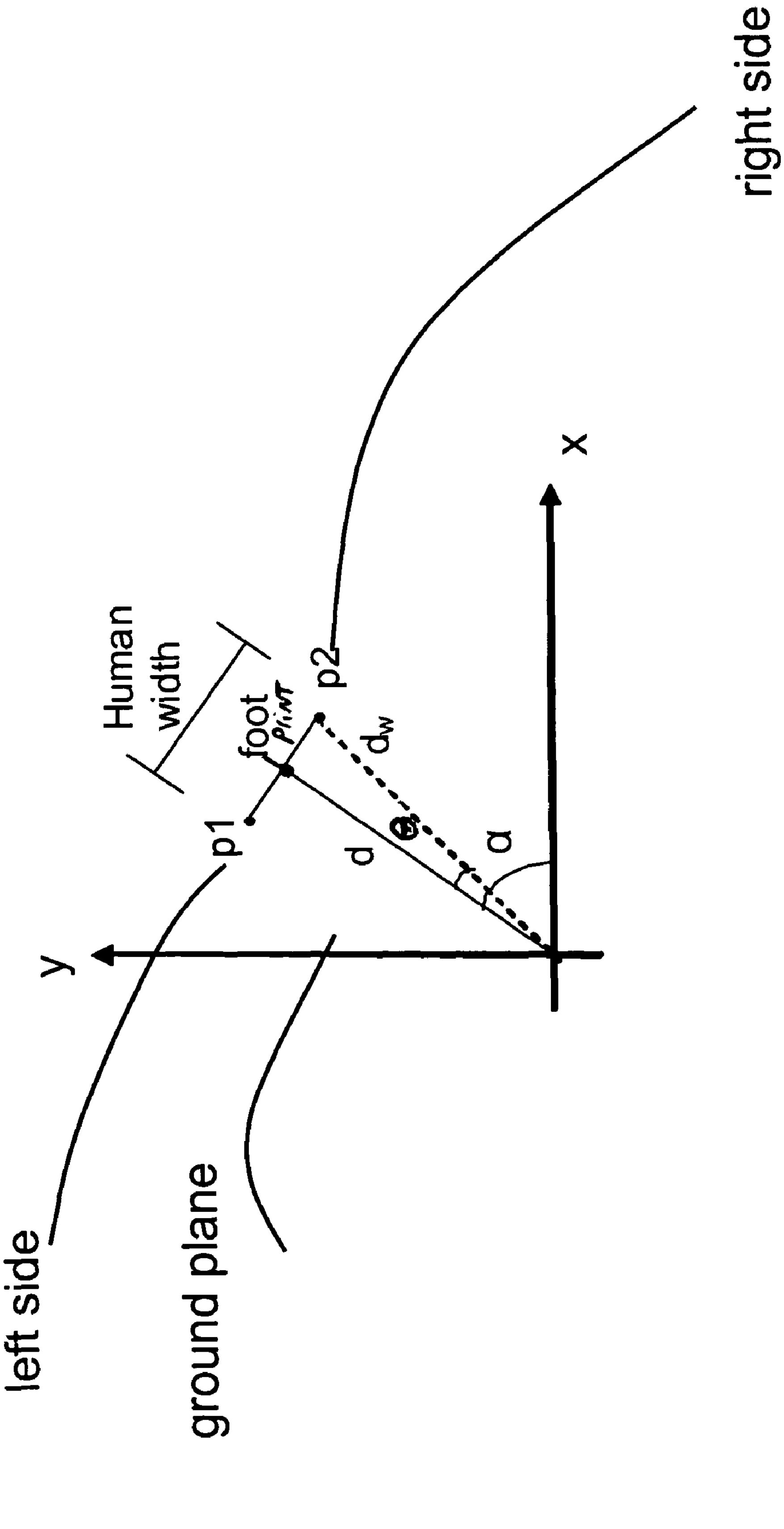
FIG. 9 depicts the projections of the left and right sides of the human on the ground plane according to an exemplary embodiment of the present invention.

FIG. 9 depicts the projection of the left and right side of the human on the ground plane. Points $P_1$ and $P_2$ represent the left side and right side, respectively, of the human. Angle a represents the angle of the footprint and θ represents the angle between the footprint and one of the sides. The width of the human in omni image at a particular pixel may be calculated using the following equations:

$$w_h = \sqrt{(x'_{p1} - x'_{p2})^2 + (y'_{p1} - y'_{p2})^2}$$

$$\alpha = \arctan\left(\frac{f_y}{f_x}\right)$$

$$\theta = \arctan\left(\frac{w_h}{2d}\right)$$

-continued $$d_w = \sqrt{d^2 + (w_h/2)^2}$$

$$x_{p1} = \cos(\alpha - \theta) \cdot d_w \quad y_{p1} = \sin(\alpha - \theta) \cdot d_w$$

$$x_{p2} = \cos(\alpha + \theta) \cdot d_w \quad y_{p2} = \sin(\alpha + \theta) \cdot d_w$$

$$x'_{p1} = F_0(x_{p1}, y_{p1}) \quad y'_{p1} = F_1(x_{p1}, y_{p1})$$

$$x'_{p2} = F_0(x_{p2}, y_{p2}) \quad y'_{p2} = F_1(x_{p2}, y_{p2})$$

Where $W_t$ is the human width in the real world, which, for example, may be assumed as 0.5 meters. $(x_{p1}, y_{p1})$ and $(x_{p2}, y_{p2})$ represent the left and right side of the human in world coordinate; $(x'_{p1}, y'_{p1})$ and $(x'_{p2}, y'_{p2})$ represent the left and right side in the omni image. $F_0(\,)$ and $F_1(\,)$ are still the transform functions from world coordinates to image coordinates.

Figure 10:
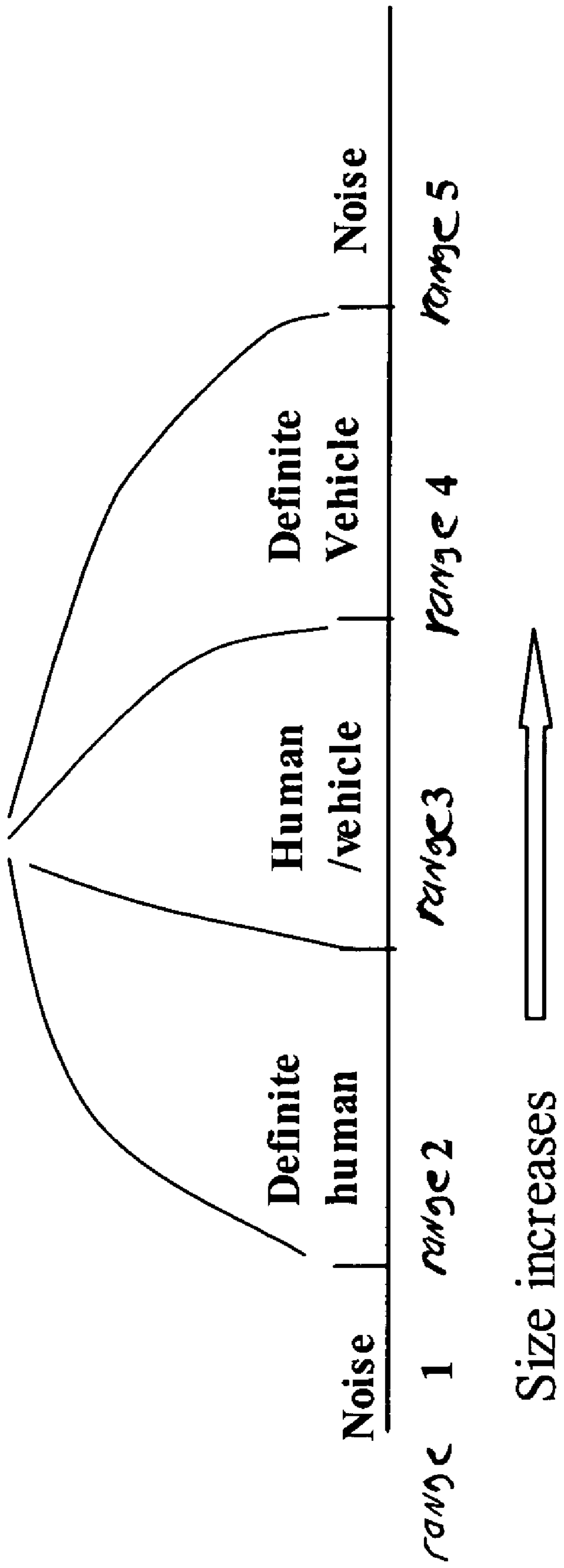
FIG. 10 depicts the criteria for target classification when using human size map according to an exemplary embodiment of the present invention.

Turning now to FIG. 10, an example of the use of a human size map in classification is given. Initially, the footprint I(x, y) of a target in the omni image is located. The size of the target in the omni image is then determined. The target size may correspond to the width of the bounding box for the target multiplied by the height of the bounding box for the target. The human size map is then used to find the reference human size value for the footprint of the target. This is done by referring to the point in the human size map, M(x, y), corresponding to the footprint in the image. The reference human size from the human size map is compared to the target size to classify the target.

For example, FIG. 10 illustrates one method for classifying the target based on the target size. A user may define particular ranges for the difference between the reference human size value and the calculated target size. The target is classified depending which range it falls into. FIG. 10 illustrates five different ranges, range 1 indicates that the target is noise, range 2 indicates that the target is human, range 3 is indeterminate, range 4 indicates that the target is vehicle, range 5 indicates that the target is noise. If the target size is too big or too small, the target may be classified as noise, ranges 1 and 5 of FIG. 10. If the target size is close to the reference human size value, but not large enough to be considered noise, the target may be classified as a vehicle, range 4 in FIG. 10. If the target size is undistinguishable, range 3, other features of the target, such as the warped aspect ratio, may be used to classify the target. The thresholds between the ranges may be set based on user preferences. Examples of the thresholds include if the target size is less than 50% of human size, it is noise which is in region 1, or if the target size is 4 times of human size, it may be vehicle, which is in region 4.

Please note that the human size map is only one of the possible target classification reference maps. In different situations, other types of target size maps may be used.

Region Map and Target Classification

A region map is another tool that may be used for target classification. A region map divides the omni image into a number of different regions. The region map should be the same size as the image. The number and types of regions in the region map may be defined by a user. The use may use a graphical interface or a mouse to draw or otherwise define the regions on the region map. Alternatively, the regions may be detected by an automatic region classification system. The different types of targets that may be present in each region may be specified. During classification, the particular region that a target is in is determined. The classification of targets may be limited to those target types specified for the region that the target is in.

Figure 11:
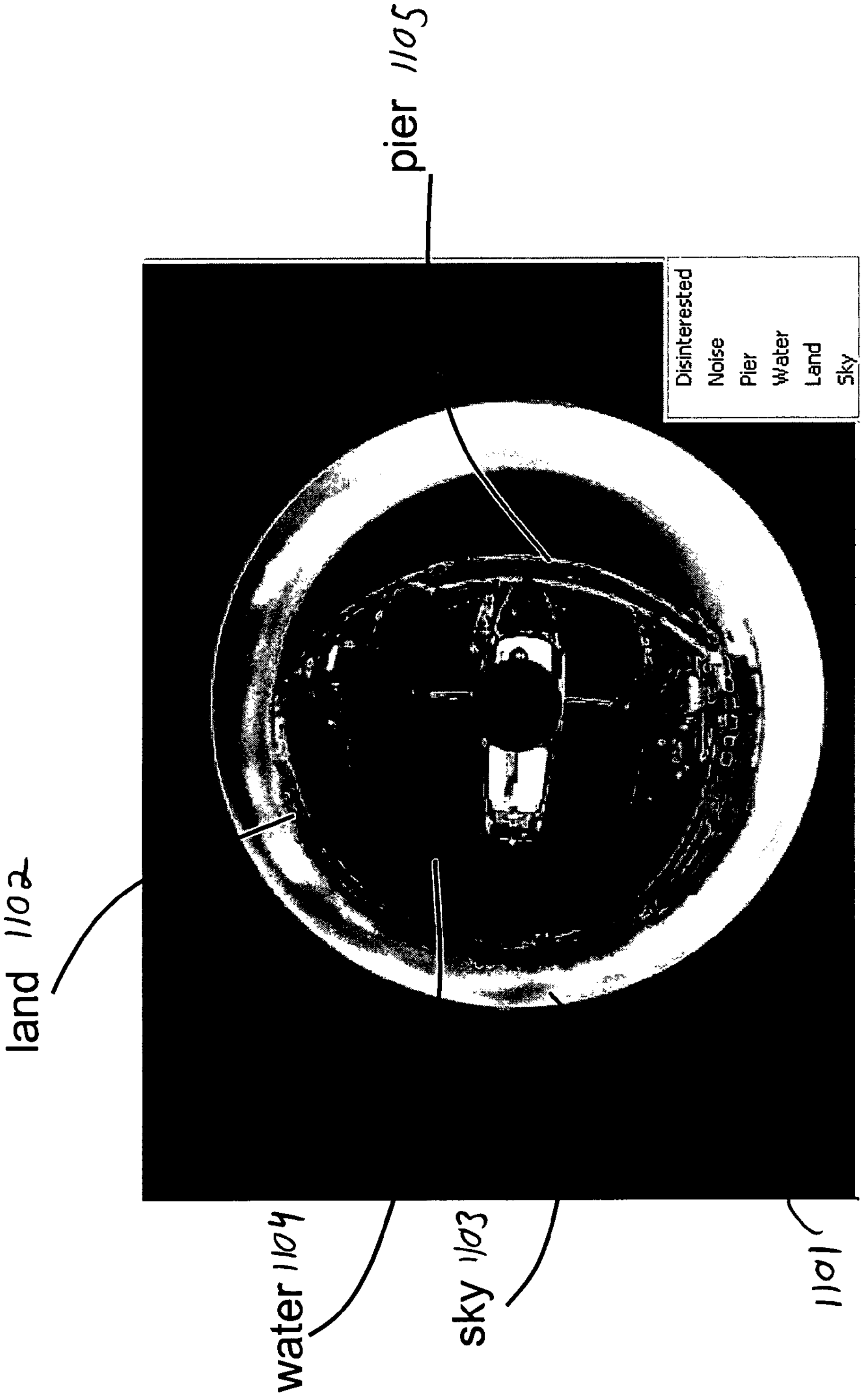
FIG. 11 depicts an example of region map according to an exemplary embodiment of the present invention.

For example, if the intelligent video surveillance system is deployed on a vessel, the following types of regions may be present: pier, water, land and sky. FIG. 11 depicts an example of a region map 1101 drawn by user, with land region 1102, sky region 1103, water region 1104 and pier region 1105. In the land region 1102, targets are mainly human and vehicle. Consequently, it may be possible to limit the classification of targets in this region as between vehicle and human. Other types of target types may be ignored. In that case, a human size map and other features such as warped aspect-ratio may be used for classification. In the water region 1104, it may be of interest to classify between different types of water crafts. Therefore, a boat size map might be necessary. In the sky region 1103, the detected targets may be just noise. By applying the region map, target classification may be greatly improved.

Two special regions may also be included in the region map. One region may be called "area of disinterest," which indicates that the user is not interested in what happens in this area. Consequently, this particular area in the image may not undergo classification processing, helping to reduce the computation cost and system errors. The other specified region may be called "noise," which means that any new target detected in this region is noise and should not be tracked. However, if a target is detected outside of the "noise" region, and the target subsequently moves into this region, the target should be tracked, even though in the "noise" region.

The Definition of Footprint of the Target in Omni-Directional Image

Figure 12:
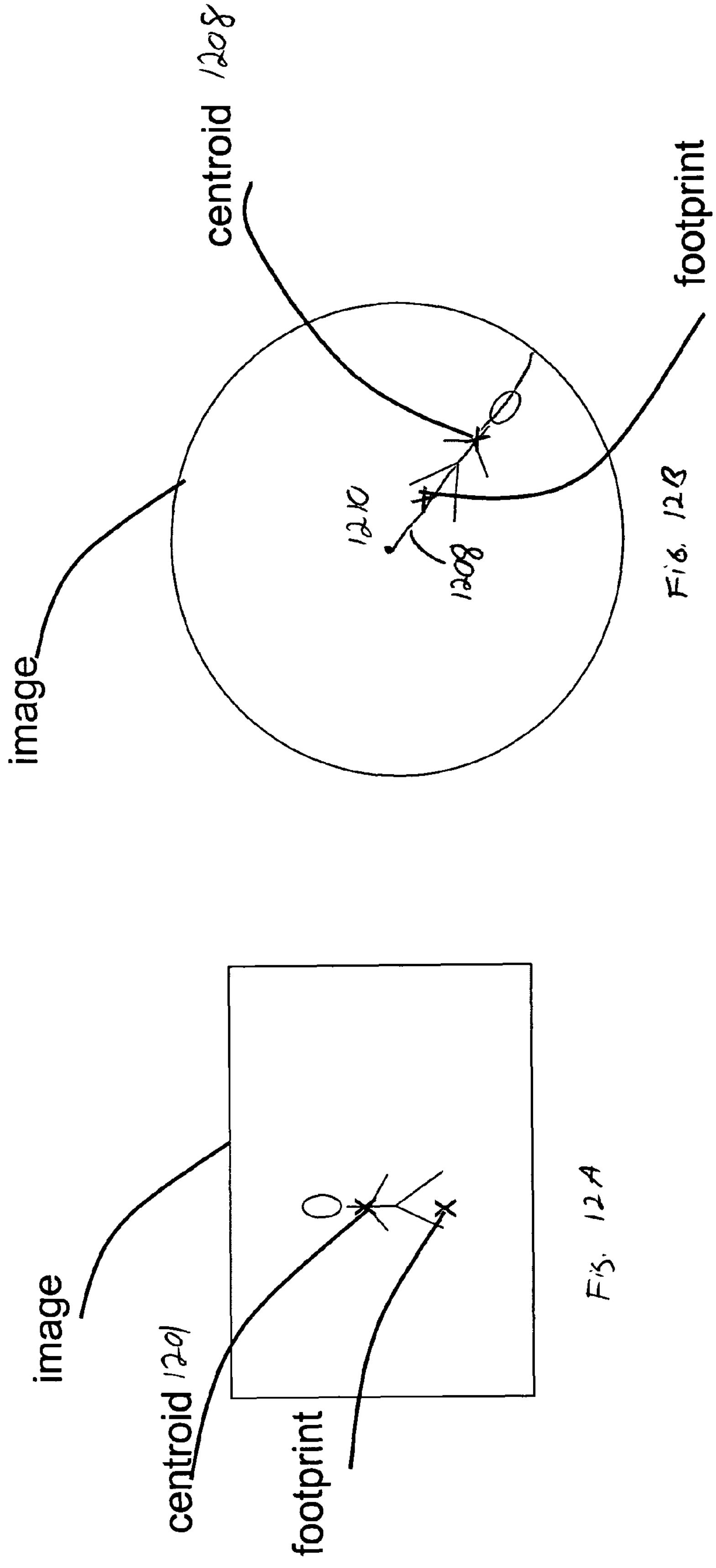
FIG. 12 depicts the location of the target footprint in perspective image and omni image according to an exemplary embodiment of the present invention.

A footprint is a single point or pixel in the omni image which represents where the target "stands" in the omni image. For a standard camera, this point is determined by projecting a centroid 1201 of the target blob towards a bottom of the bounding box of the target until the bottom of the target is reached, as shown in FIG. 12A. The geometry model for an omni-directional camera is quite different from a standard perspective camera. As such, the representation of the footprint of the target in omni-directional image is also different. As shown in FIG. 12B, for an omni-directional camera, the centroid 1208 of the target blob should be projected along the direction of the radius 1208 of the image towards the center 1210 of the image.

However, the footprint of a target in the omni image may vary with the distance between the target and the omni-directional camera. Here, an exemplary method to compute the footprint of the target in the omni image when a target is far from the camera is provided. The centroid 1302 of the target blob 1304 is located. A line 1306 is created between the centroid 1302 of the target and the center C of the omni image. A point P on the target blob contour that is closest to the center C is located. The closet point P is projected on the line 1306. The projected point P' is used as the footprint.

Figure 13:
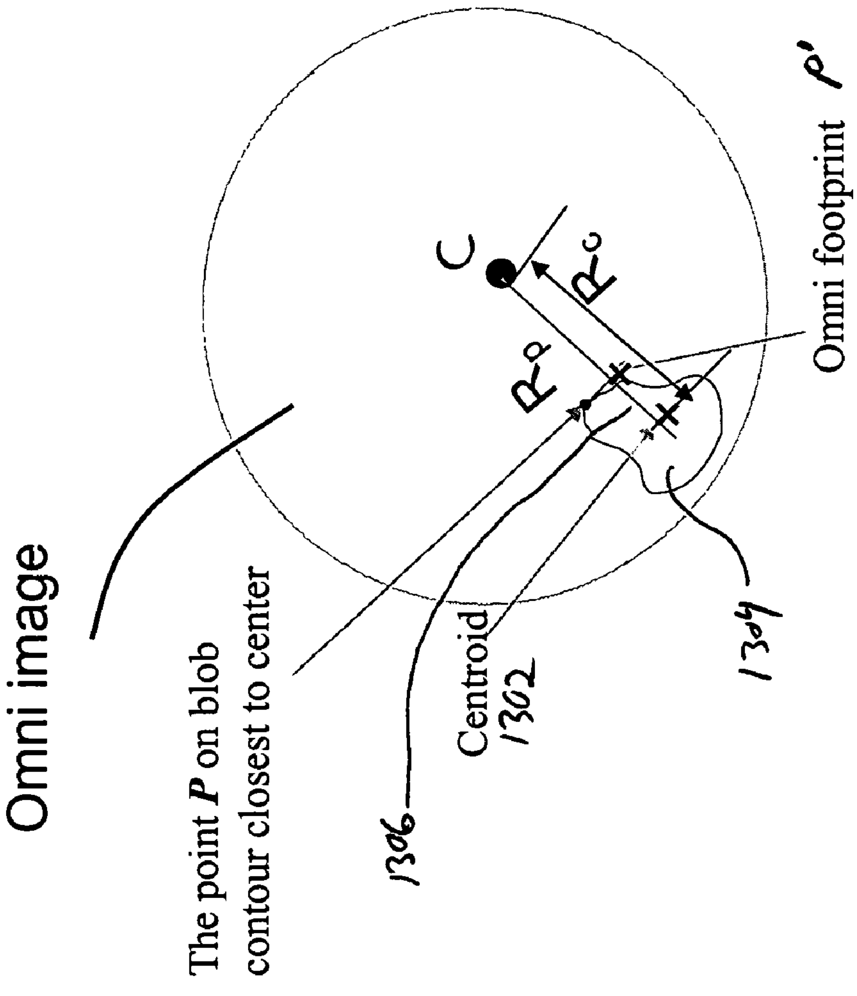
FIG. 13 depicts how the footprint is computed in the omni image according to an exemplary embodiment of the present invention.

However as the target gets closer to the camera, the real footprint should move closer to the centroid of the target. Therefore, the real footprint should be a combination of the centroid and the closest point. The following equations illustrate the computation details. FIG. 13 illustrates the meaning of the each variable in the equations, where $R_c$ is the distance between the target centroid 1302 and center C, $R_p$ is the distance between the projected point P' and the center C, and W is the weight and which is calculated using Sigmoid equation, where $\lambda$ may be decided experimentally.

$$r = \frac{R_p + R_c}{2R}$$

$$R_f = W * R_c + (1 - W) * R_p$$

$$W = \frac{1}{1 + \exp(\lambda(r - 0.5))} \quad \lambda = 10$$

$$r \le 0.01 \quad W = 1$$

$$r \ge 0.99 \quad W = 0$$

The equations shows that that when the target is close to the camera, its footprint may be close to its centroid and when the target is far from the camera, its footprint may be close to the closest point P.

Omni-Directional Camera Placement Tool

A camera placement tool may be provided to determine the approximate location of the camera's monitoring range. The camera placement tool may be implemented as a graphical user interface (GUI). The camera placement tool may allow a user to determine the ideal surveillance camera settings and location of cameras to optimize event detection by the video surveillance system. When the system is installed, the cameras should ideally be placed so that their monitoring ranges cover the entire area in which a security event may occur. Security events that take place outside the monitoring range of the cameras may not be detected by the system.

The camera placement tool may illustrate, without actually changing the camera settings or moving equipment, how adjusting certain factors, such as the camera height and focal length, affect the size of the monitoring range. Users may use the tool to easily find the optimal settings for an existing camera layout.

Figure 14:
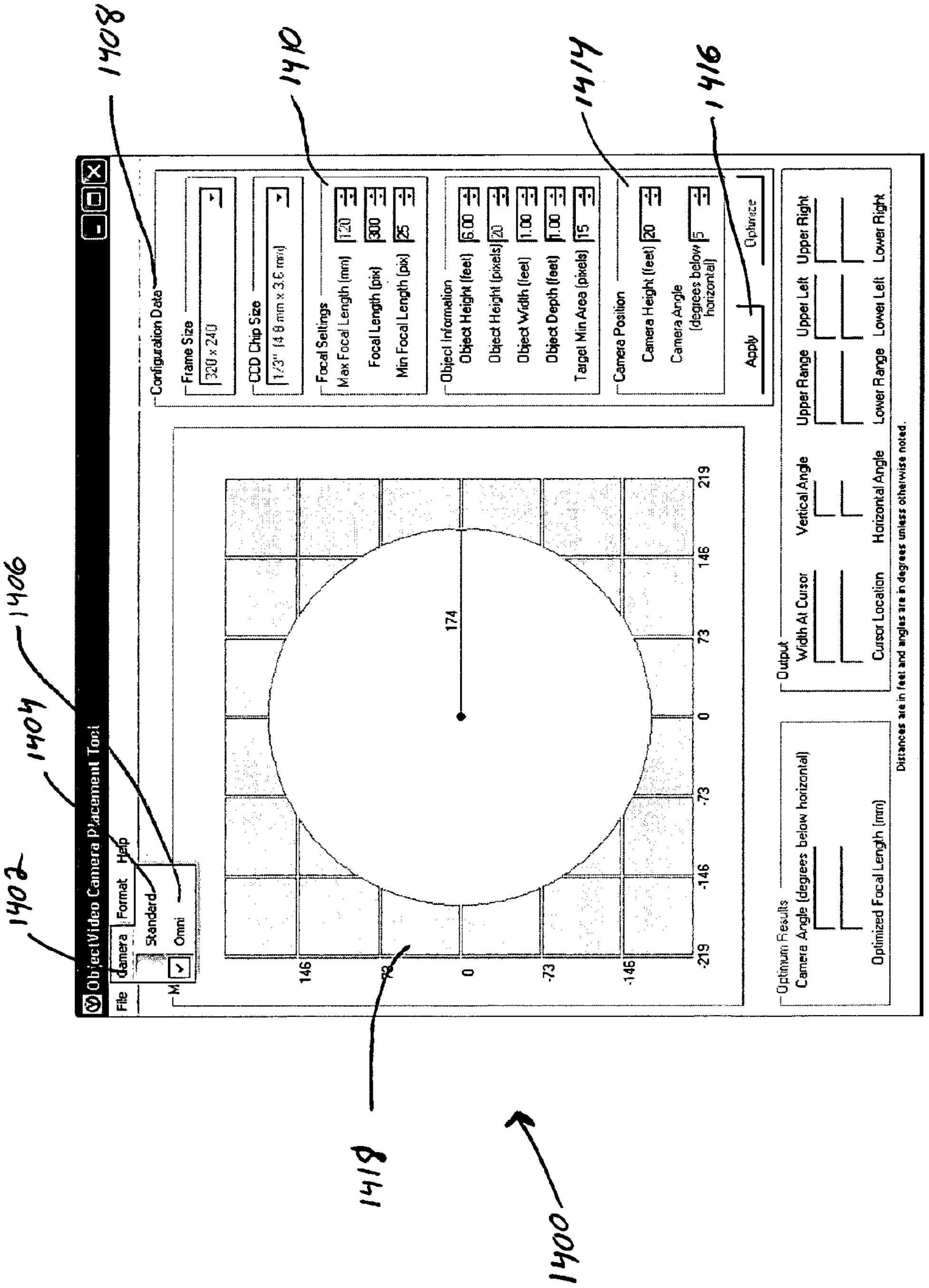
FIG. 14 depicts a snapshot of the omni camera placement tool according to an exemplary embodiment of the present invention.

FIG. 14 illustrates an exemplary camera placement tool GUI 1400. The GUI 1400 provides a camera menu 1402 from which a user may select from different types of cameras. In the illustrated embodiment, the user may select a standard 1404 or omni-directional 1406 camera. Here, the omni-directional camera has been selected. Certainly, there are categories of cameras and different types of omni-directional cameras. The GUI 1400 may be extended to let the user specify other types of cameras and/or the exact type of omni camera to obtain the appropriate camera geometry model.

After the camera is selected, the configuration data area 1408 is populated accordingly. Area 1408 allows a user to enter information about the camera and the size of an object that the system should be able to detect. For the omni-directional camera, the user may input: focal settings, such as focal length in pixels, in area 1410, object information, such as object physical height, width and depth in feet and the minimum target area in pixels, in the object information area 1412, and camera position information, such as the camera height in feet, in camera position area 1414.

By hitting the apply button 1416, the monitoring range of the system is calculated based on the omni camera's geometry model and is displayed in area 1418. The maximum value of the range of the system may also be marked.

Rules for Omni-Directional Camera

Figure 15:
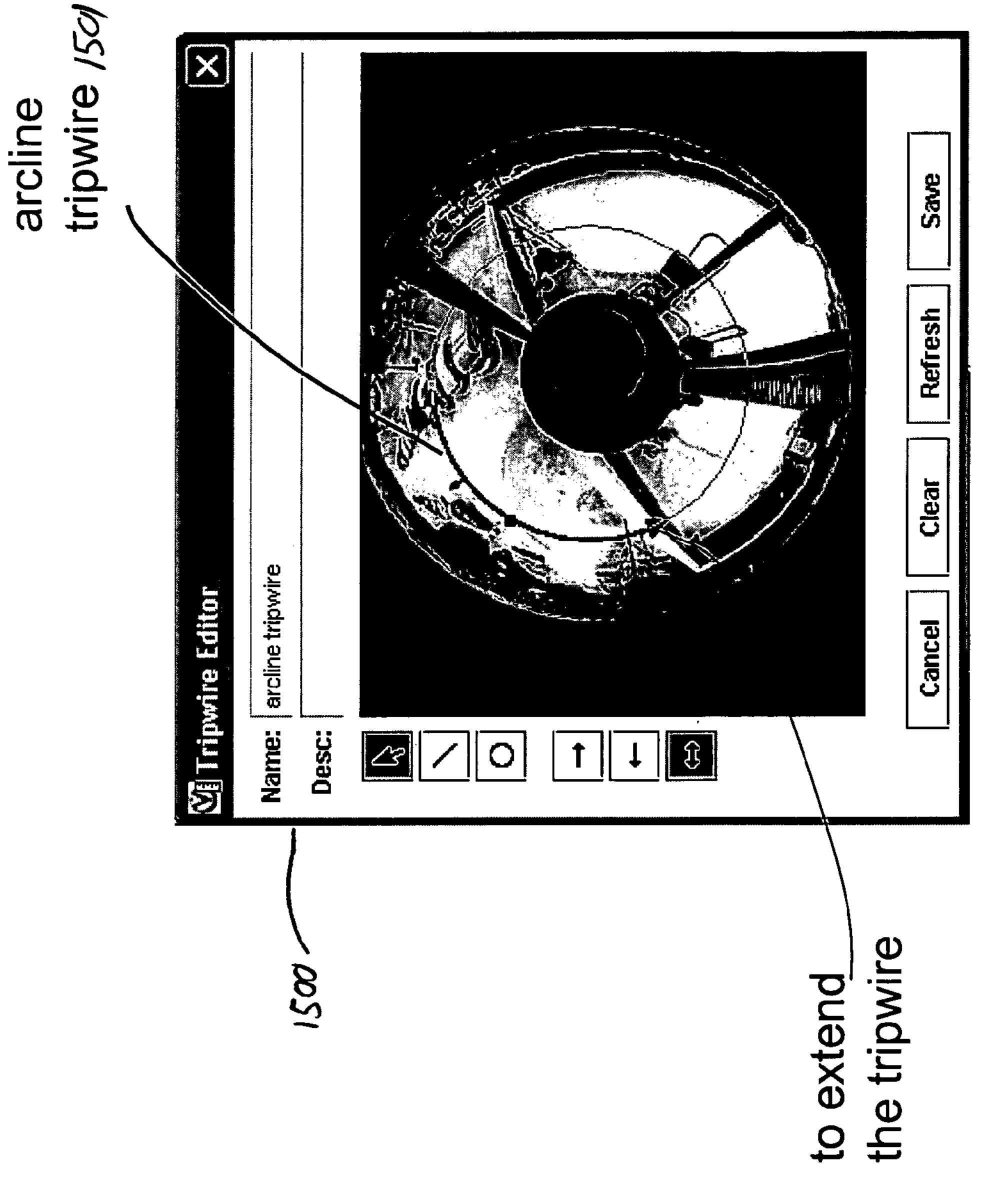
FIG. 15 depicts arc-line tripwire for rule definition according to an exemplary embodiment of the present invention.

A Rule Management Tool (RMT) may be used to create security rules for threat detection. An exemplary RMT GUI 1500 is depicted in FIG. 15. Rules tell the intelligent surveillance system which security-related events to look for on surveillance cameras. A rule consists of a user defined event, a schedule, and one or more responses. An event is a security-related activity or other activity of interest that takes place within the field of view of a surveillance camera. If an event takes place during the period of time specified in the schedule, the intelligent surveillance system may generate a response.

Figure 16:
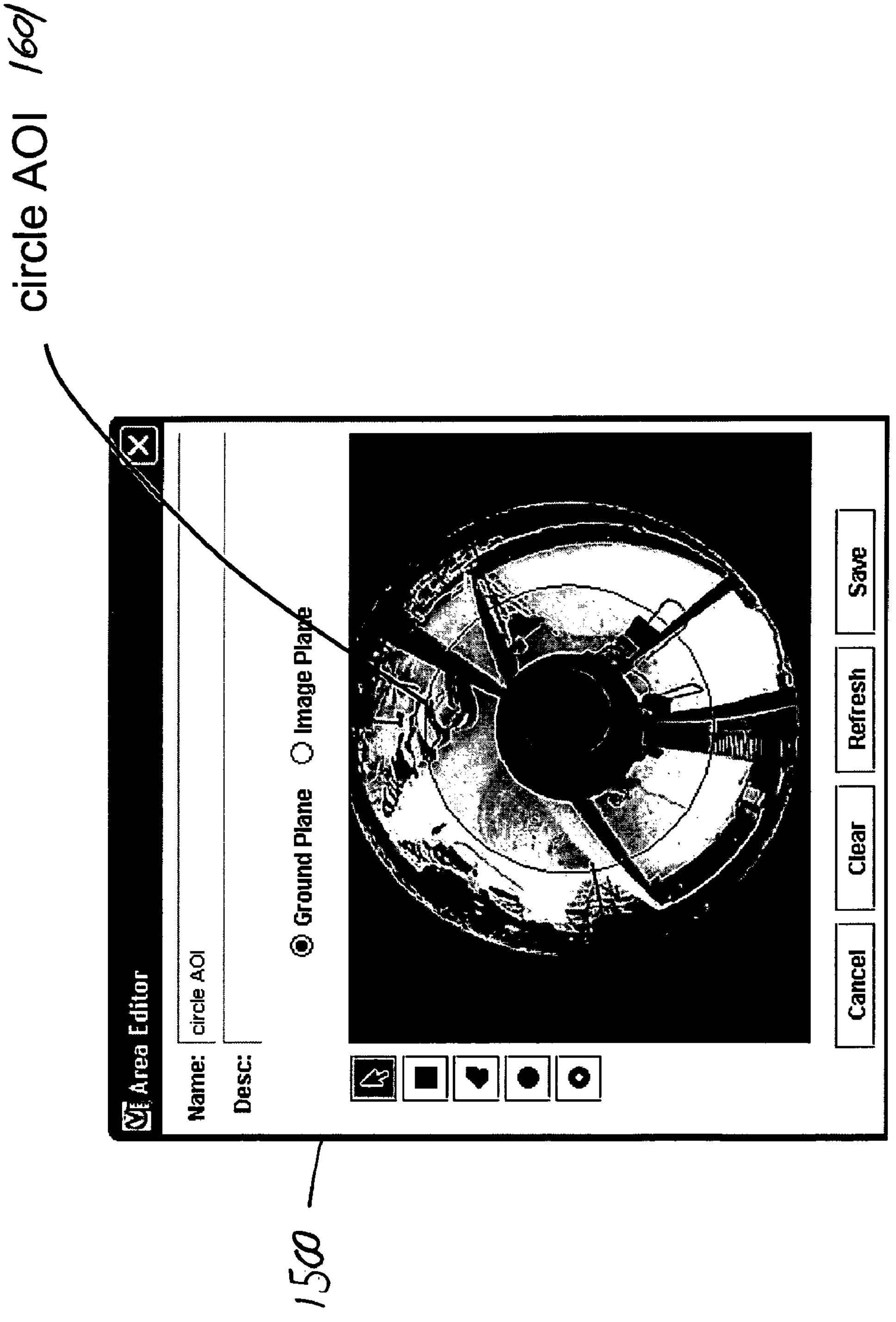
FIG. 16 depicts circle area of interest for rule definition according to an exemplary embodiment of the present invention.
Figure 17:
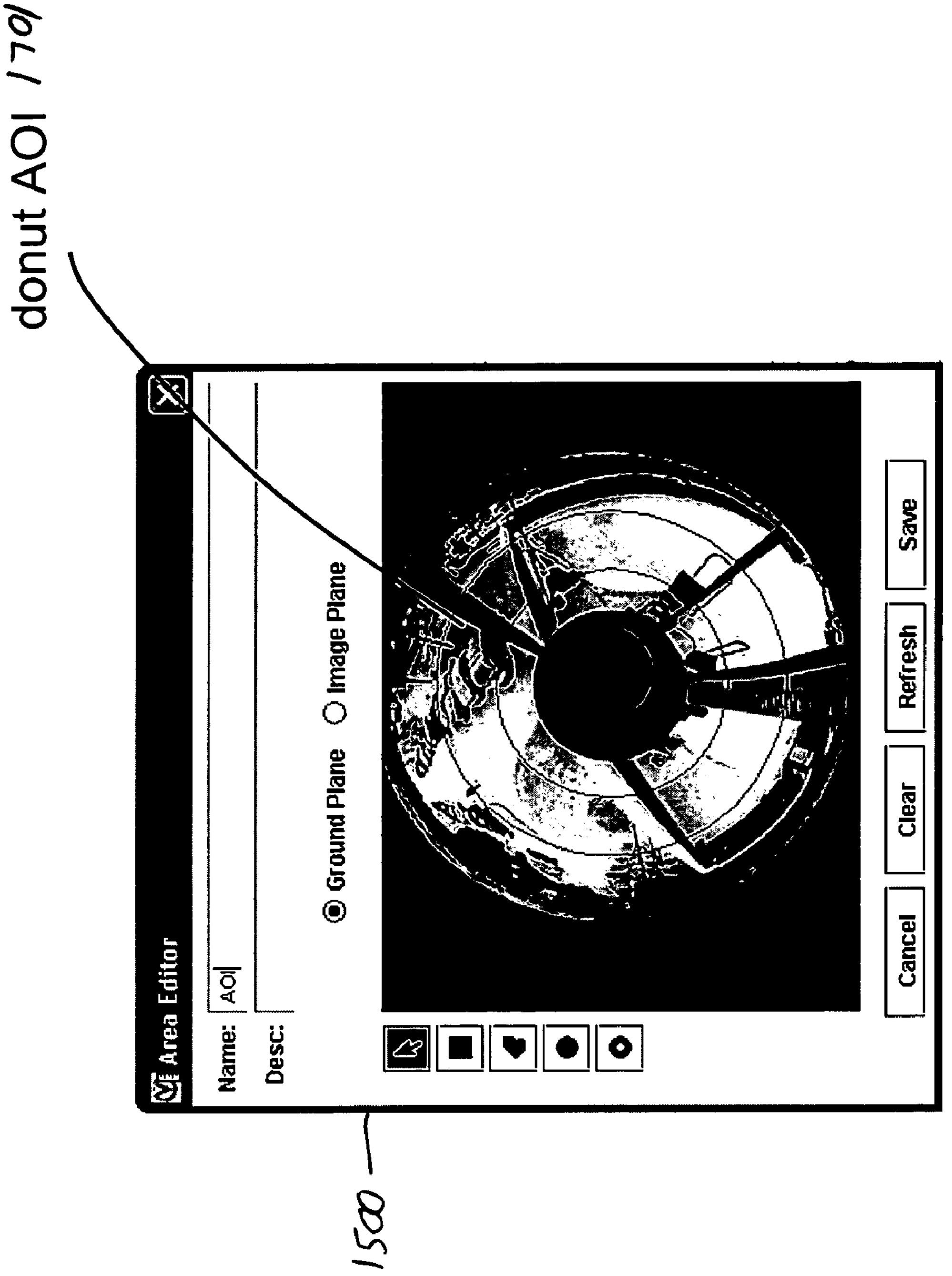
FIG. 17 depicts donut area of interest for rule definition according to an exemplary embodiment of the present invention.

Various types of rules may be defined. In an exemplary embodiment, the system presents several predefined rules that may be selected by a user. These rules include an arc-line tripwire, circle area of interest, and donut area of interest for event definition. The system may detect when an object enters an area of interest or crosses a trip wire. The user may use an input device to define the area of interest on the omni-directional camera image. FIG. 15 depicts the definition of arc-line tripwire 1501 on an omni image. FIG. 16 depicts the definition of a circle area of interest 1601 on an omni image. FIG. 17 depicts the definition of a donut area of interest 1701 on an omni image.

Rule Definition on Panoramic View

Figure 18:
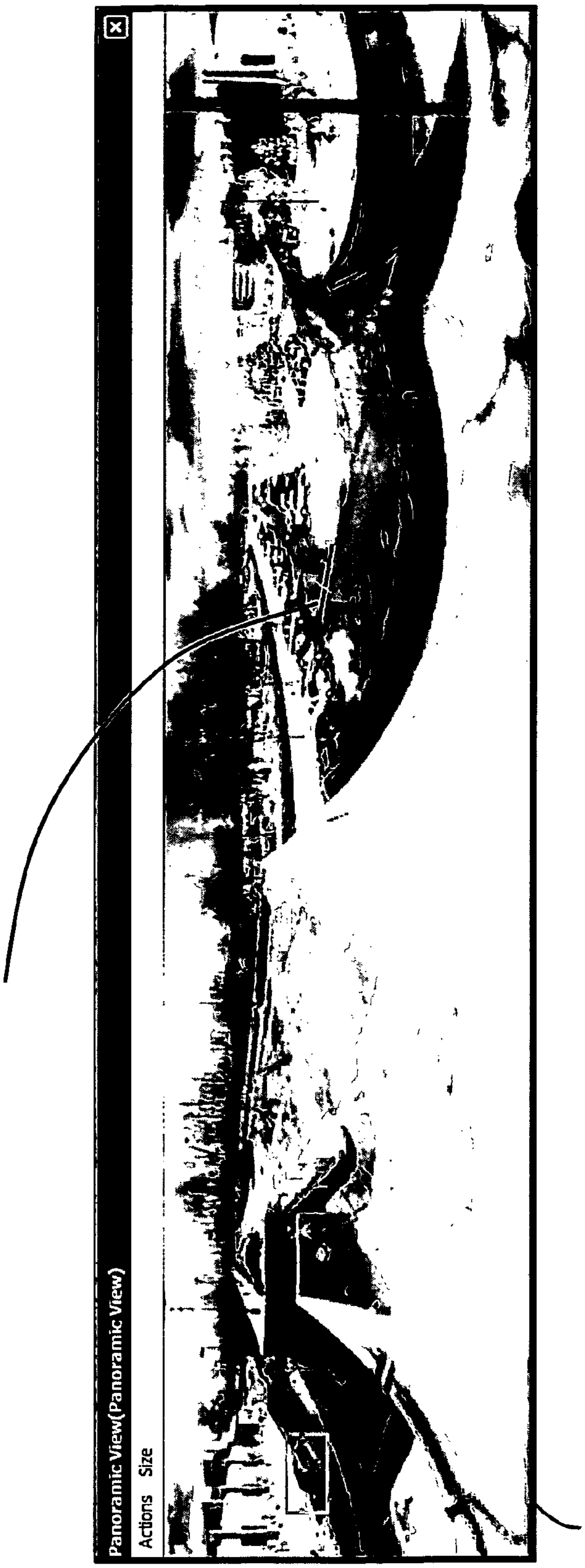
FIG. 18 depicts the rule definition in panoramic view according to an exemplary embodiment of the present invention.

An omni-directional image is not an image that is seen in everyday life. Consequently, it may be difficult for a user to define rules on the omni image. Therefore, embodiments of the present invention present a tool for rule definition on a panoramic view of a scene. FIG. 18 depicts the concept. A panoramic view 1800 is generated from an omni image. A user may draw line tripwire 1802 or other shape of area of interest on the panoramic view. Then when the surveillance system receives the rule defined on the panoramic view, the rule may be converted back to the corresponding curve or shape in the omni image. Event detection processing may still be applied to the omni image. The conversion from the omni image to the panoramic view is based on the omni camera calibration model. For example, the dimensions of the panoramic view may be calculated based on the camera calibration model. For each pixel $I(x_p, y_p)$ in the panoramic view, the corresponding pixel $I(x_o, y_o)$ in the omni image is found based on the camera calibration model. If $x_o$ and $y_o$ are not integers, an interpolation method, such as nearest neighbor or linear interpolation, may be used to compute the right value for $I(x_p, y_p)$ Perspective and Panoramic View in Alert If a rule is set up and an event of interest based on the rule occurs, an alert may be generated by the intelligent video surveillance system and sent to a user. An alert may contain information regarding the camera which provides a view of the alert, the time of the event, a brief sentence to describe the event, for instance, "Person Enter AOI", one or two snapshots of the target and the target marked-up with a bounding box in the snapshot. The omni-image snapshot may be difficult for the user to understand. Thus, a perspective view of the target and a panoramic view of the target may be presented in an alert.

Figure 19:
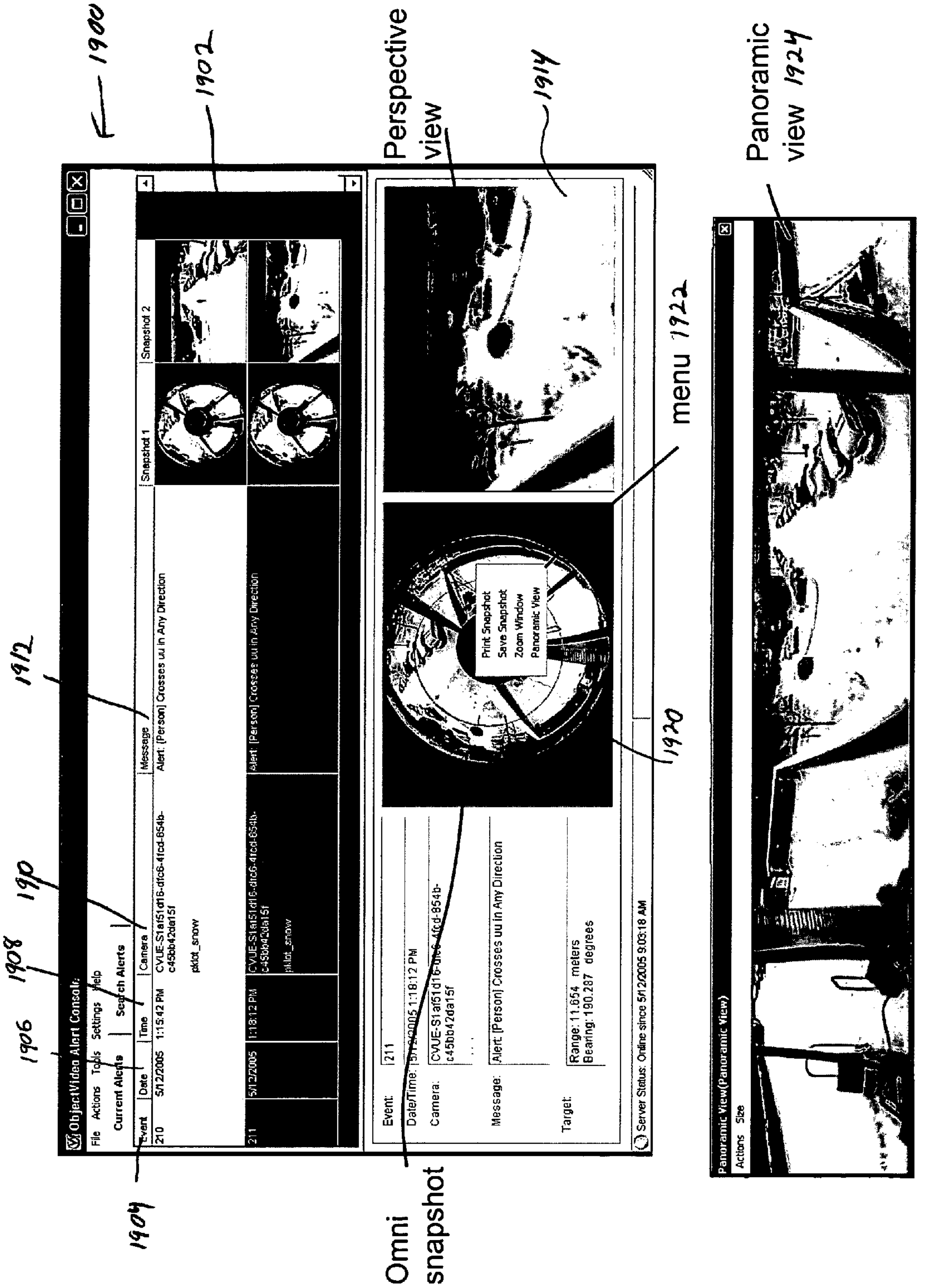
FIG. 19 depicts the display of perspective and panoramic view in alerts according to an exemplary embodiment of the present invention.

FIG. 19 depicts one example for an alert display 1900. The alert display 1900 is divided into two main areas. A first main area 1902 includes a summary of information for current alerts. In the embodiment illustrated, the information provided in area 1902 includes the event 1904, date 1906, time 1908, camera 1910 and message 1912. A snapshot from the omni-directional camera and a snapshot of a perspective view of the target, 1914, 1916, respectively, are also provided. The perspective view of the target may be generated from the omni-image based on the camera model and calibration parameters in a known manner.

The user may select a particular one of the alerts displayed in area 1902 for a more detailed view. In FIG. 19, event 211 is selected as is indicated by the highlighting. A more detailed view of the selected alert is shown in a second main area 1914 of the alert display 1900. The user may obtain additional information regarding the alert from the second main area 1914. For example, the user may position a cursor over the snapshot 1920 of the omni-image, at which point a menu 1922 may pop up. The menu 1922 presents the user with a number of different options including, print snapshot, save snapshot, zoom window, and panoramic view. Depending on the user's selection, more detail regarding the event is provided. For example, here, the panoramic view is selected. A new window 1924 may pop up displaying a panoramic view of the image with the target marked in the panoramic view, as shown in FIG. 19.

2D Map-Based Camera Calibration

Embodiments of the inventive system may employ a communication protocol for communicating position data between the primary sensing unit and the secondary sensing unit. In an exemplary embodiment of the invention, the cameras may be placed arbitrarily, as long as their fields of view have at least a minimal overlap. A calibration process is then needed to communicate position data between primary 102 and secondary 108. There are a number of different calibration algorithms that may be used.

In an exemplary embodiment of the invention, measured points in a global coordinate system, such as a map (obtained using GPS, laser theodolite, tape measure, or any measuring device), and the locations of these measured points in each camera's image are used for calibration. The primary sensing unit 100 uses the calibration and a site model to geo-locate the position of the target in space, for example on a 2D satellite map.

A 2D satellite map may be very useful in the intelligent video surveillance system. A 2D map provides details of the camera and target location, provides visualization information for user, and may be used as a calibration tool. The cameras may be calibrated with the map, which means to compute the camera location in the map coordinates $M(x_0, y_0)$, camera physical height H and the view angle offset, and a 2D map-based site model may be created. A site model is a model of the scene viewed by the primary sensor. The field of the view of the camera and the location of the targets may be calculated and the targets may be marked on the 2D map.

Figure 20:
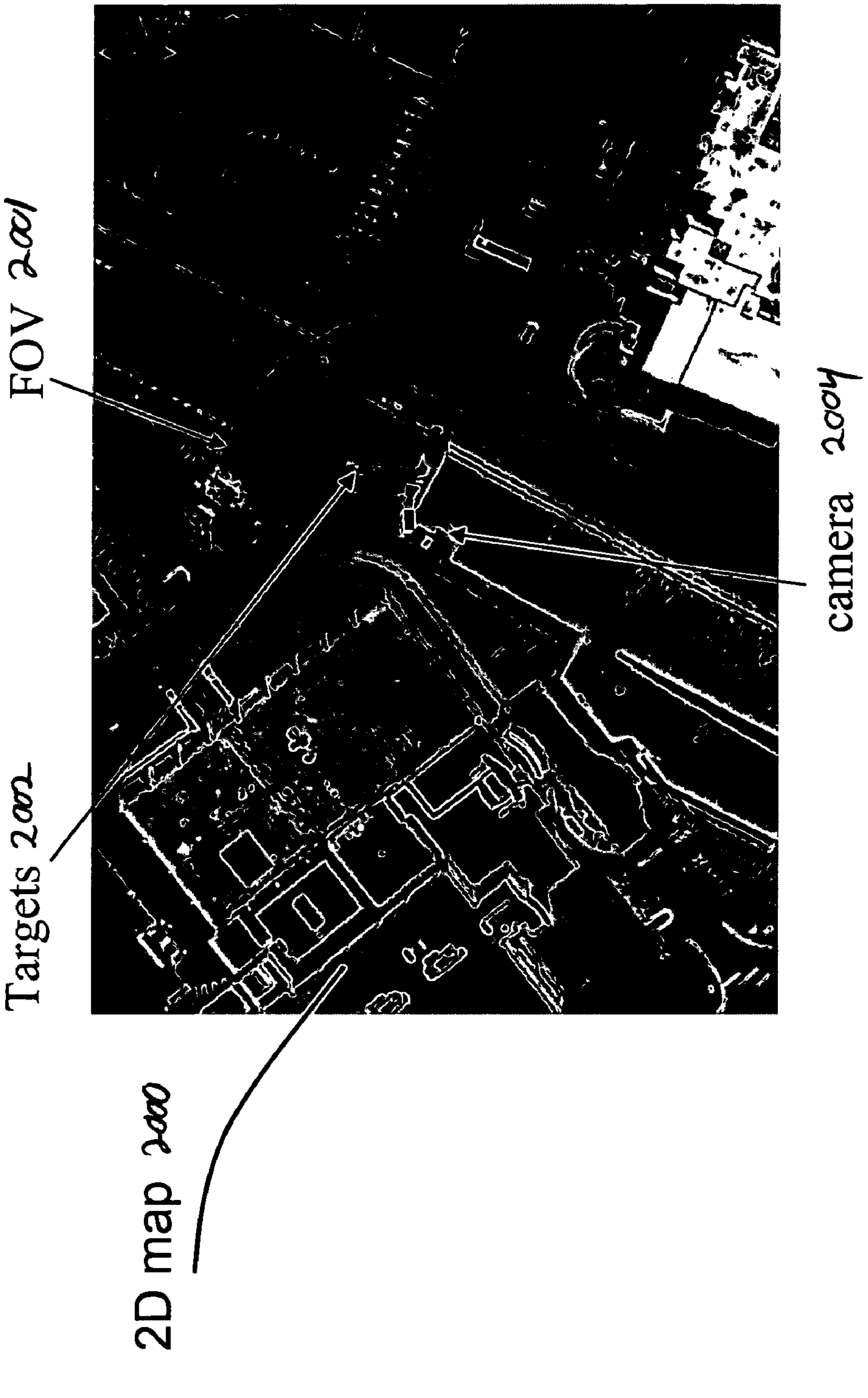
FIG. 20 depicts and example of a 2D map-based site model with omni-directional camera's FOV and target icons marked on it according to an exemplary embodiment of the present invention.

FIG. 20 depicts an example of a 2D map-based site model 2000 with omni-directional camera's FOV 2001 and target icons 2002 marked thereon. The camera is located at point 2004. FIGS. 21A and 21B depicts the meaning of view offset, which is the angle offset between the map coordinate system and omni image. FIG. 21 A illustrates a map of a scene and FIG. 21B illustrates an omni image of a scene. The camera location is indicated by point O on in these figures. Angle $\alpha$ in FIG. 21A is the angle between the x-axis and point $(x_1, y_1)$. Angle $\beta$ in FIG. 21B is the angle between a corresponding point $(x_2, Y_2)$ in the omni image and the x-axis, where $(x_1, y_1)$ and $(x_2, y_2)$ correspond to the same point in the real world. The view offset represents the orientation difference between the omni-directional image and the map. As shown in FIG. 21, the viewing direction in omni image is rotated a certain angle on the map. Therefore to transform a point from an omni image to a map (or vice versa), the rotation denoted by the offset needs to be applied.

The embodiment of the video surveillance system disclosed herein includes the omni-directional camera and also the PTZ cameras. In some circumstances, the PTZ cameras receive commands from the omni camera. The commands may contain the location of targets in omni image. To perform the proper actions (pan, tilt and zoom) to track the targets, PTZ cameras need to know the location of the targets in their own image or coordinate system. Accordingly, calibration of the omni-directional and PTZ cameras is needed.

Some OMNI+PTZ systems assume that omni camera and PTZ cameras are co-mounted, in other words, the location of the cameras in the world coordinate system are the same. This assumption may simplify the calibration process significantly. However, if multiple PTZ cameras are present in the system, this assumption is not realistic. For maximum performance, PTZ cameras should be able to be located anywhere in the field view of the omni camera. This requires more complicated calibration methods and user input. For instance, the user may have to provide a number of points in both the omni and PTZ images in order to perform calibration, which may increase the difficulty in setting up the surveillance system.

If a 2D map is available, all the cameras in the IVS system may be calibrated to the map. The cameras may then communicate with each other using the map as a common reference frame. Methods of calibrating PTZ cameras to a map are described in co-pending U.S. patent application Ser. No. 09/987,707 filed Nov. 15, 2001, which is incorporated by reference. In the following, a number of methods for the calibration of omni-directional camera to the map are presented.

2D Map-Based Omni-Directional Camera Calibration

Note that the exemplary methods presented here are based on one particular type of omni camera, which is an omni-directional camera with parabolic mirror. The methods may be applied to other types of omni cameras using that cameras geometry model. FIG. 22 depicts a geometry model for an omni-directional camera with parabolic mirror. Where the angle ⊖ may be calculated using the following equation, where h is the focal length of the camera in pixels and the circle radius, r is the distance between the project point of the incoming ray on the image and the center.

$$\tan(\theta) = \frac{2hr}{h^2 - r^2}$$

A one-point camera to map calibration method may be applied if the camera location on the 2D map is known, otherwise a four-point calibration method may be required. For both of the methods, there is an assumption that the ground plane is flat and is parallel to the image plane. This assumption, however, does not always hold. A more complex, multi-point calibration, discussed below, may be used to improve the accuracy of calibration when this assumption is not fully satisfied.

One-Point Calibration

If a user can provide the location of the camera on the map, one pair of points, one point in the image, image coordinate $I(x_2, y_2)$ and a corresponding point on the map, map coordinate $M(x_1, y_1)$, are sufficient for calibration. Based on the geometry of the omni camera (shown in FIG. 22), camera height is computed as:

$$H = \frac{h^2 - r^2}{2hr} R$$

As mentioned above and shown in FIG. 22, h is camera focal length in pixels, R is the distance between the a point on the ground plane to the center and r is the distance between projected point of the corresponding ground point in the omni image to the circle center.

The angle offset is computed as:

$$\text{offset} = \alpha - \beta = a\tan\left(\frac{y_1}{x_1}\right) - a\tan\left(\frac{y_2}{x_2}\right)$$

where α and β are shown in FIG. 21.

Four-Point Calibration

If the camera location is not available, four pairs of points from the image and map are needed. The four pairs of points are used to calculate the camera location based on a simple geometric property. One-point calibration may then be used to obtain the camera height and viewing angle offset.

Figure 23:
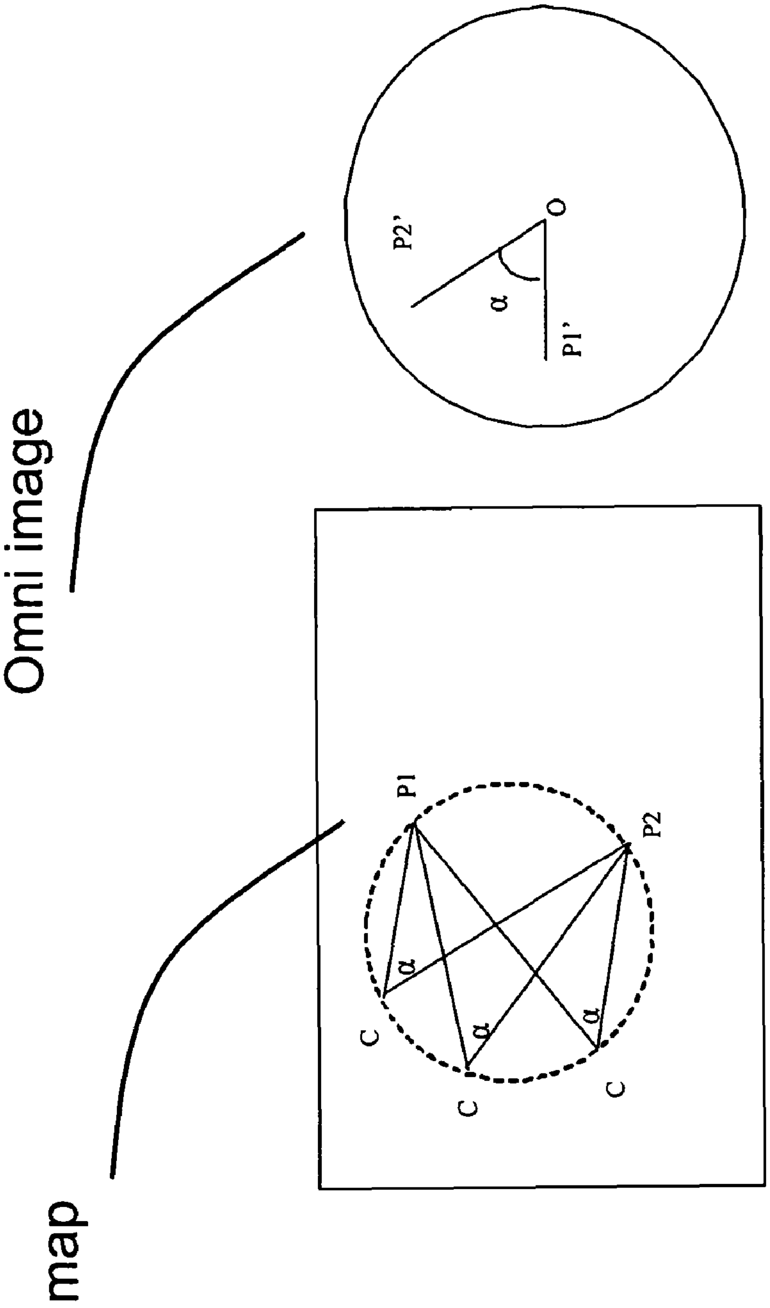
FIG. 23 depicts how the omni location on the map is computed with multiple pairs of calibration points according to an exemplary embodiment of the present invention.

The following presents an example of how the camera location on the map $M(x_O, y_O)$ is calculated based on the four pairs of points input by the user. The user provides four points on the image and four points on the map that correspond to those points on the image. With the assumption that the image plane is parallel to the ground plane, an angle between two viewing directions on the map is the same as an angle between the two corresponding viewing directions on the omni image. Using this geometric principle, as depicted in FIG. 23, an angle α between points $P_1'$ and $P_2'$ in the omni-image plane is computed, assuming O is the center of the image. The camera location $M(x_O, y_O)$ in the map plane must be on the circle that is defined by $p_1$, $p_2$ and α With more points, additional circles are created and $M(x_O, y_O)$ may be limited to the intersections of the circles. Four pairs point may guarantee one solution.

From the user's perspective, the one-point calibration approach is easier since selecting pairs of points on the map and on the omni images is not a trivial task. Points are usually selected by positioning a cursor over a point on the image or map and selecting that point. One mistake in point selection could cause the whole process to fail. Selecting the camera location on the map, on the other hand, is not as difficult.

Figure 24:
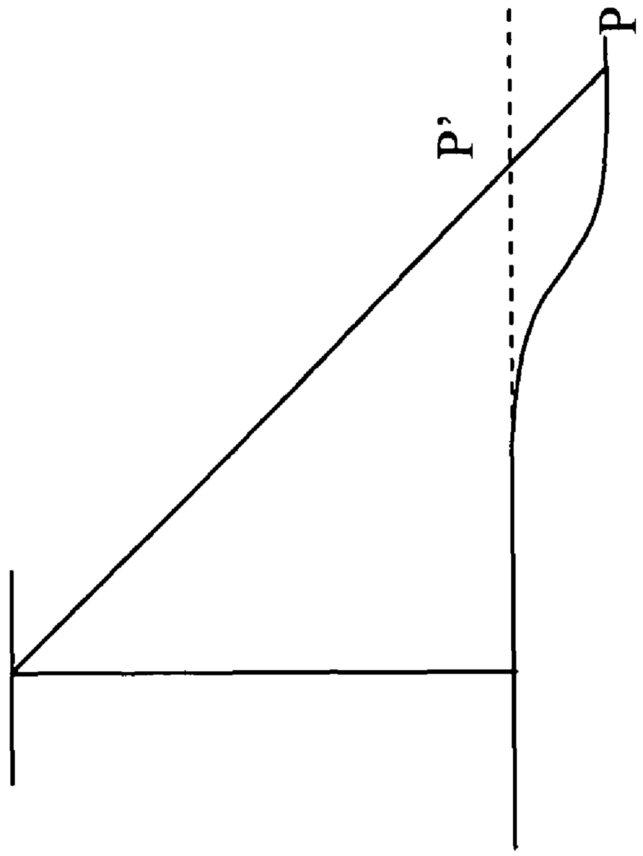
FIG. 24 depicts an example of how a non-flat ground plane may cause an inaccurate calibration.

As mentioned, both the above-described calibration methods are based on the assumption that the ground plane is parallel to the camera and the ground plane is flat. In the real world, one omni-directional camera may cover a 360° with a 500 foot field of view, and the assumptions may not be applied. FIG. 24 depicts an example that how a non-flat ground plane may cause inaccurate calibration. In the example, the actual point is at P, however, with the flat ground assumption, the calibrated model "thinks" the point is at P'. In the following sections, two exemplary approaches are presented to address this issue. The approaches are based on the one-point and four-point calibrations separately and are called enhanced one-point calibration and multi-point calibration.

Enhanced One-Point Calibration

Figure 25:
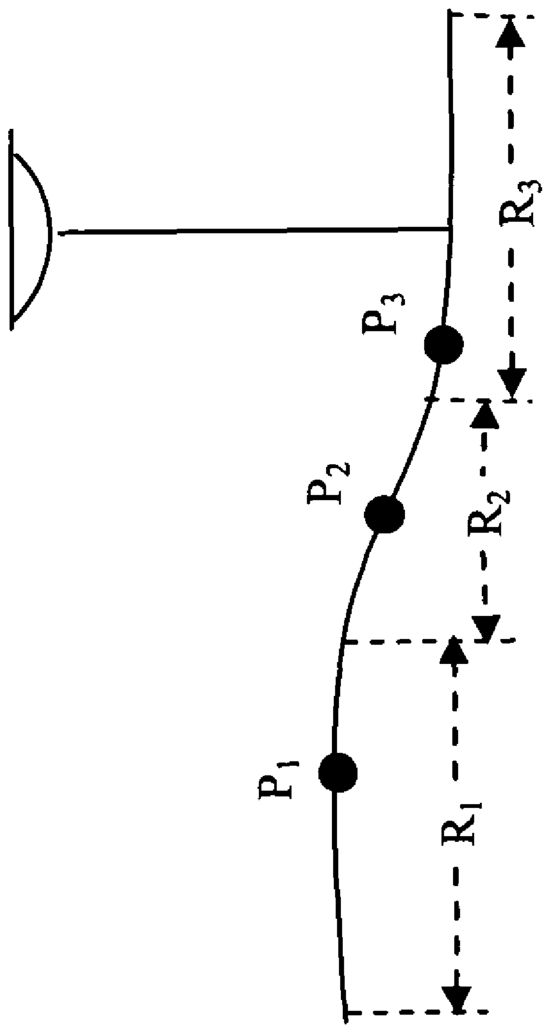
FIG. 25 depicts an example of the division of regions according to an exemplary embodiment of the present invention, where the ground plane is divided into three regions and there is a calibration point in each region.

To solve the irregular ground problem, the ground is divided into regions. Each region is provided with a calibration point. It is assumed that the ground is flat only in a local region. Note that it is still only necessary to have one point in the map representing the camera location. For each region, the one-point calibration method may be applied to obtain the local camera height and viewing angle offset in that region. When target gets into a region, the target's location on the map and other physical information are calculated based on the calibration parameters of this particular region. With this approach, the more calibration points that there are, the more accurate the calibration results. For example, FIG. 25 depicts an example where the ground plane is divided into three regions $R_1$-$R_3$ and there is a calibration point $P_1$-$P_3$, respectively, in each region. Region $R_2$ is a slope and further partition of $R_2$ may increase the accuracy of calibration.

As mentioned above, the target should be projected to the map using the most suitable local calibration information (calibration point). In an exemplary embodiment, three methods may be presented at runtime to select calibration points. The first is a straightforward approach to use the calibration point closest to the target. This approach may have less than satisfactory performance when the target and the calibration point happen to be located in two different regions and there is a significant difference between the two regions.

A second method is spatial closeness. This is an enhanced version of the first approach. Assuming that a target does not "jump around" on the map, The target's current position should always be close to the target's previous position. When switching calibration points, based on the nearest point rule, the physical distance between the target's previous location and its current computed location is determined. If the distance is larger than a certain threshold, the prior calibration point may be used. This approach can greatly improve the performance of target projection and it can smooth the target movement as displayed on the map.

The third method is region map based. A region map as described above to improve the performance of target classification may also be applied to improve calibration performance. Assuming that the user provides a region map and each region includes substantially flat ground, as a target enters each region; the corresponding one-point calibration should be used to decide the projection of the target on the map.

Multi-Point Calibration

Figure 26:
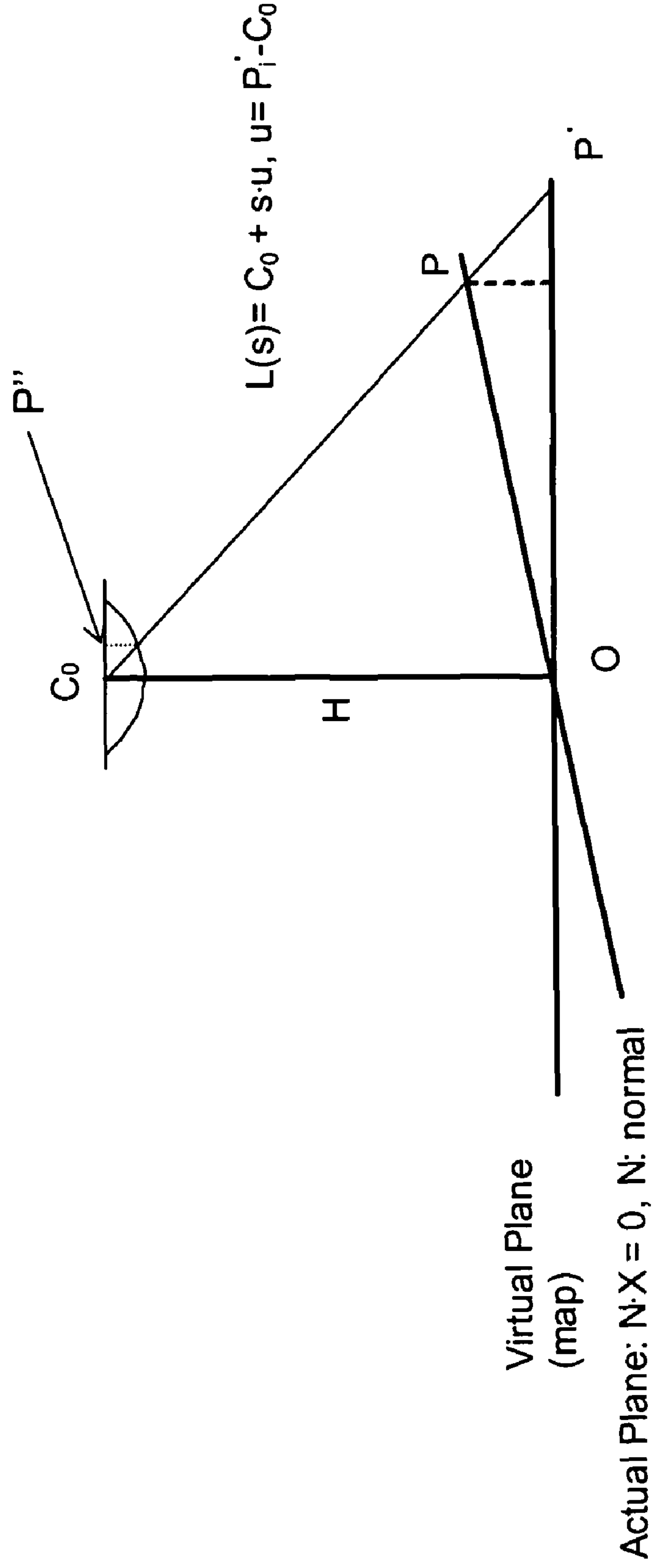
FIG. 26 depicts the multiple-point calibration method according to an exemplary embodiment of the present invention.

As depicted in FIG. 26, there is one point P on the ground plane and it has its projection point P" in the image plane. Based on the camera calibration information, we can also back-project P" to the ground plane and get the point P'. If the ground plane is flat and parallel to the image plane, P and P' should be the same point, but if the assumption does not hold, these two points may have different coordinates.

The incoming ray L(s) may be defined by camera center $C_0$ and P'. And this ray should intersect with the ground plane at P. The projection of P on the map plane is the corresponding selected calibration point. L(s) may be represented with the following equations:

$$L(s) = C_0 + S \cdot u$$

$$u = P - C_0$$

$$S = \frac{C_0 \cdot N}{N \cdot u}$$

$$X = SX'$$

$$Y = SY'$$

Where, x and y are the coordinates of the selected calibration point on the map; X' and Y' can be represented with camera calibration parameters. There are seven unknowns: calibration parameters, camera location, camera height, normal of actual plane N, and viewing angle offset. Four point pairs are sufficient to compute the calibration model, but the more point pairs that are provided, the more accurate the calibration model is. The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A video surveillance system, comprising: a first sensing unit having a substantially 360 degree field of view and adapted to detect an event in the field of view; a communication medium connecting the first sensing unit and at least one second sensing unit, the at least one second sensing unit receiving commands from the first sensing unit to follow a target when an event of interest is detected by the first sensing unit wherein the first sensing unit comprises: an omni-directional camera; a video processing unit to receive video frames from the omni-directional camera; and an event detection unit to receive target primitives from the video processing unit, to receive user rules to detect the event of interest based on the target primitives and the rules and to generate the commands for the second sensing unit.

2. The system of claim 1, wherein the first sensing unit comprises an omni-directional camera.

3. The system of claim 1, wherein the video processing unit further comprises a first module for automatically calibrating the omni-directional camera.

4. The system of claim 1, further comprising a camera placement module to determine a monitoring range of the first sensing unit based on user input regarding a configuration of the first sensing unit.

5. The system of claim 1, further comprising a rule module to receive user input defining the event of interest.

6. The system of claim 1, wherein the at least one second sensing unit comprises a PTZ camera.

7. The system of claim 6, wherein the at least one second sensing unit operates as an independent sensor when an event is not detected by the first sensing unit.

8. The system of claim 1, further comprising a target classification module for classifying the target by target type.

9. The system of claim 8, wherein the target classification module is adapted to determine a warped aspect ratio for the target and to classify the target based at least in part on the warped aspect ratio.

10. The system of claim 8, wherein the target classification module is adapted to classify the target based at least in part on a target size map.

11. The system of claim 10, wherein the target classification module is adapted to compare a size of the target the target size map.

12. The system of claim 8, wherein the target classification module is adapted to classify the target based at least in part on a comparison of a location of a target in an image to a region map, the region map specifying types of targets present in that region.

13. A method of operating a video surveillance system, the video surveillance system including at least two sensing units, the method comprising: using a first sensing unit having a substantially 360 degree field of view detect an event in a field of view of the first sensing unit wherein the first sensing unit comprises an omni-directional camera; sending location information regarding a target from the first sensing unit to at least one second sensing unit when an event is detected by the first sensing unit, automatically calibrating the omni-directional camera wherein the automatic calibration process comprises: determining if a video frame from the omni-directional camera is valid; performing edge detection to generate a binary edge image if the frame is valid; performing circle detection based on the edge detection; and creating a camera model for the omni-directional camera based on results of the edge detection and circle detection.

14. The method of claim 13, wherein the at least one second sensing unit comprises a PTZ camera.

15. The method of claim 13, further comprising determining if an auto calibration flag is set and performing the method of claim only when the flag is set.

16. The method of claim 13, further comprising determining a monitoring range of the first sensor based on user input regarding a configuration of the first sensing unit.

17. The method of claim 13, further comprising determining the location information based on a common reference frame.

18. A computer readable medium containing software implementing the method of claim 13.

19. The method of claim 13, wherein the location information is based on a common reference frame.

20. The method of claim 19, further comprising calibrating the omni-directional camera to the common reference frame.

21. The method of claim 20, wherein calibrating the omni-directional camera further comprises: receiving user input indicating the camera location in the common reference frame, a location of a point in an image and a corresponding point in the common reference frame; and calibrating the camera based at least in part on the input.

22. The method of claim 20, wherein calibrating the omni-directional camera further comprises: receiving user input indicating four pairs of points including four image points in an image and four points in the common reference frame corresponding to the four image points, respectively; and calibrating the camera based at least in part on the user input.

23. The method of claim 20, wherein calibrating the omni-directional camera further comprises: dividing the image into a plurality of regions; calculating calibration parameters for each region; projecting the target to the common reference frame using the calibration parameters for that region which includes the target.

24. The method of claim 13, further comprising classifying the target by target type.

25. The method of claim 24, further comprising determining a warped aspect ratio for the target.

26. The method of claim 25, wherein classifying comprises classifying the target based at least in part on the warped aspect ratio.

27. The method of claim 26, wherein determining the warped aspect ration further comprises: determining a contour of the target in an omni image; determining a first distance from a point on the contour closest to a center of the omni image to the center of the omni image; determining a second distance from a point of the contour farthest from the center of the omni image to the center of the omni image; determining a largest angle between any two points on the contour; and calculating a warped height and a warped width based at least in part on a camera model, the largest angle, and the first and second distances.

28. The method of claim 24, further comprising classifying the target based at least in part on a comparison of a location of the target to a region map, the region map specifying types of targets present in that region.

29. The method of claim 28, wherein classifying further comprises: receiving user input defining regions in the region map and the target types present in the regions; and selecting one of the specified target types as the target type.

30. The method of claim 24, further comprising classifying the target based at least in part on a target size map.

31. The method of claim 30, wherein the target size map is a human size map.

32. The method of claim 31, further comprising generating the human size map by: selecting a pixel in an image; transforming the pixel to a ground plane based on the camera model; determining projection points for a head, left and right sides on the ground plane based on the transformed pixel; transforming the projections points to the image using the camera model; determining a size of a human based on distances between the projection points; and storing the size information at the pixel location in the map.

33. The method of claim 31, further comprising; determining a footprint of the target; determining a reference value for a corresponding point in the target size map; and classifying the target based on a comparison of the two values.

34. The method of claim 32, wherein determining the footprint comprises: determining a centroid of the target; and determining a point on a contour of the target closest to a center of the image; projecting the point to a line between the center of the image and the centroid; and using the projected point as the footprint.

35. The method of claim 33, further comprising determining the footprint based on a distance of the target from the omni-directional camera.

36. A video surveillance system, comprising: a first sensing unit having a substantially 360 degree field of view and adapted to detect an event in the field of view; a communication medium connecting the first sensing unit and at least one second sensing unit, the at least one second sensing unit receiving commands from the first sensing unit to follow a target when an event of interest is detected by the first sensing unit; and a target classification module for classifying the target by target type.

* * * * *